US012718031B2

(12) United States Patent
Portisch et al.

(10) Patent No.: US 12,718,031 B2
(45) Date of Patent: Aug. 25, 2026

(54) NATURAL LANGUAGE GENERATOR DATA GENERATION

(71) Applicant: SAP SE, Walldorf (DE)

(72) Inventors: Jan Portisch, Bruchsal (DE); Sandra Bracholdt, Dielheim (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 18/583,212

(22) Filed: Feb. 21, 2024

(65) Prior Publication Data

US 2025/0265423 A1 Aug. 21, 2025

(51) Int. Cl.
*G06F 40/40* (2020.01)
*G06F 16/21* (2019.01)

(52) U.S. Cl.
CPC ............ *G06F 40/40* (2020.01); *G06F 16/211* (2019.01)

(58) Field of Classification Search
CPC ............................... G06F 40/40; G06F 16/211
See application file for complete search history.

(56) References Cited

U.S. PATENT DOCUMENTS

2021/0374146 A1* 12/2021 Hrastnik ........... G06F 16/24573
2022/0415320 A1 12/2022 Zheng et al.
2024/0311273 A1* 9/2024 Kuo .................... G06F 11/3684
2025/0085936 A1* 3/2025 Guttridge .................. G06F 8/35

FOREIGN PATENT DOCUMENTS

EP 258 127 10/2023

OTHER PUBLICATIONS

Extended European Search Report received in European application No. 25158876.0, dated Jun. 16, 2025, 6 pages.

Jinfeng et al., "TiQi: A natural language interface for querying software project data," 2017 32$^{nd}$ IEEE/ACM International Conference on Automated Software Engineering (ASE), IEEE, Oct. 30, 2017 pp. 973-977.

* cited by examiner

*Primary Examiner* — Bhavesh M Mehta
*Assistant Examiner* — Joseph J. Yamamoto
(74) *Attorney, Agent, or Firm* — Klarquist Sparkman, LLP

(57) ABSTRACT

Techniques and solutions are provided for generating data that complies with a definition for a data artifact, such as attribute datatypes, attribute value constraints, or attribute referential constraints. In addition, the data is semantically appropriate for what a given attribute of the data artifact represents, such as a name or an email address. A schema stored in a computing system is accessed to retrieve a definition of a data artifact. The schema is parsed and information about attributes for the data artifact are added to a prompt. The prompt is submitted to a natural language generator. The natural language generator generates data sets, such as rows of a table, in response to the prompt. The data sets are then processed and inserted into a data repository.

20 Claims, 27 Drawing Sheets

700

```
CREATE TABLE BusinessPartner (
   ID NVARCHAR(6) NOT NULL COMMENT 'A six-digit alphanumeric string.',
   LastName NVARCHAR(100) COMMENT 'The last name.',
   MiddleName NVARCHAR(100) COMMENT 'The middle name.',
   FirstName NVARCHAR(100) COMMENT 'The first name.',
   AcademicTitle NVARCHAR(50) COMMENT 'The academic title.',
   BirthDate DATE COMMENT 'The birthdate in the format DD.MM.YYYY.',
   Gender CHAR(1) COMMENT 'F for female, M for male, X for other.',
   PRIMARY KEY (ID)
);
```

740

742a 742b 742c 742d 742e 742f 742g

| ID | Last Name | Middle Name | First Name | Academic Title | Birth Date | Gender |
|---|---|---|---|---|---|---|
| A21rF1 | Bracholdt | Heike | Sandra | M. Sc. | 18.02.1989 | F |

Figure 8:
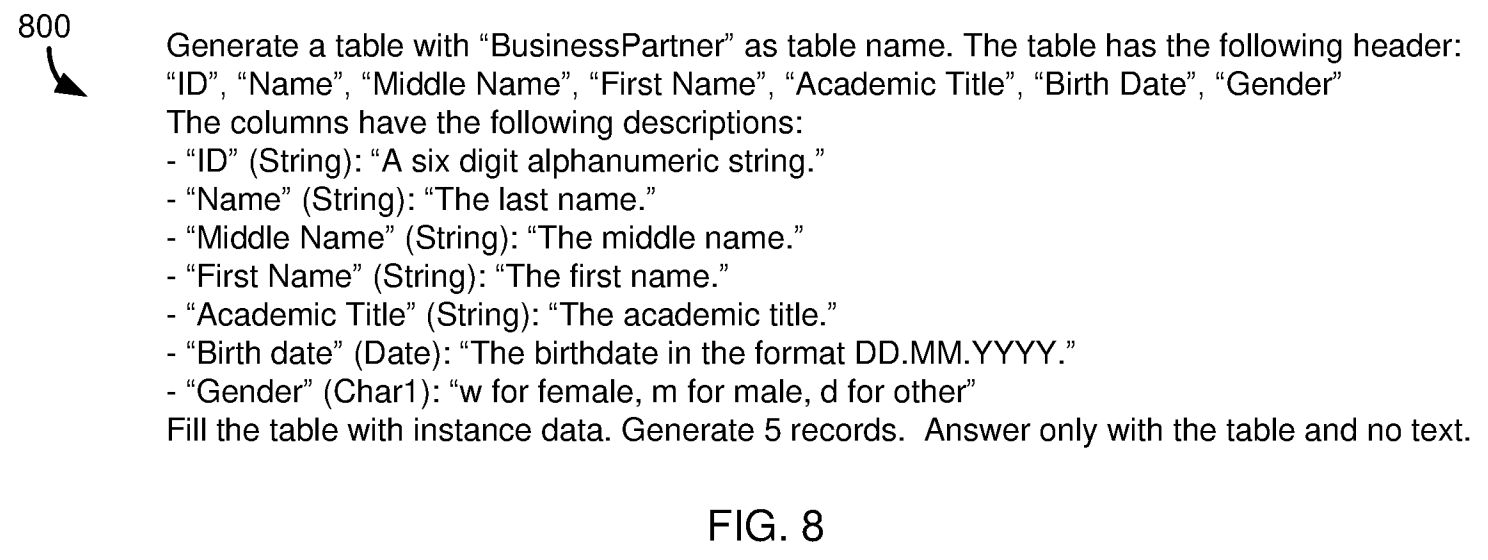

Generate a table with “BusinessPartner” as table name. The table has the following header:
“ID”, “Name”, “Middle Name”, “First Name”, “Academic Title”, “Birth Date”, “Gender”
The columns have the following descriptions:
- “ID” (String): “A six digit alphanumeric string.”
- “Name” (String): “The last name.”
- “Middle Name” (String): “The middle name.”
- “First Name” (String): “The first name.”
- “Academic Title” (String): “The academic title.”
- “Birth date” (Date): “The birthdate in the format DD.MM.YYYY.”
- “Gender” (Char1): “w for female, m for male, d for other”

Fill the table with instance data. Generate 5 records. Answer only with the table and no text.

| 910a | 910b | 910c | 910d | 910e | 910f | 910g |
|---|---|---|---|---|---|---|
| ID | Last Name | Middle Name | First Name | Academic Title | Birth Date | Gender |
| ABC123 | Smith | Michael | John | Dr. | 15.06.1985 | M |
| DEF456 | Johnson | | Alice | | 23.09.1990 | F |
| GHI789 | Lee | Albert | Robert | | 08.12.1982 | X |
| JKL012 | Wiliams | | Emily | | 30.04.1979 | F |
| MNO345 | Davis | | William | Prof. | 12.11.1995 | M |

```
INSERT INTO BusinessPartner ("ID", "Name", "Middle Name", "First Name", "Academic Title", "Birth Date", "Gender")
VALUES
  ('ABC123', 'Smith', 'Michael', 'John', 'Dr.', '1985-06-15', 'M'),
  ('DEF456', 'Johnson', NULL, 'Alice', NULL, '1990-09-23', 'F'),
  ('GHI789', 'Lee', 'Albert', 'Robert', NULL, '1982-12-08', 'X'),
  ('JKL012', 'Williams', NULL, 'Emily', NULL, '1979-04-30', 'F'),
  ('MNO345', 'Davis', NULL, 'William', 'Prof.', '1995-11-12', 'M');
```

Figure 12:
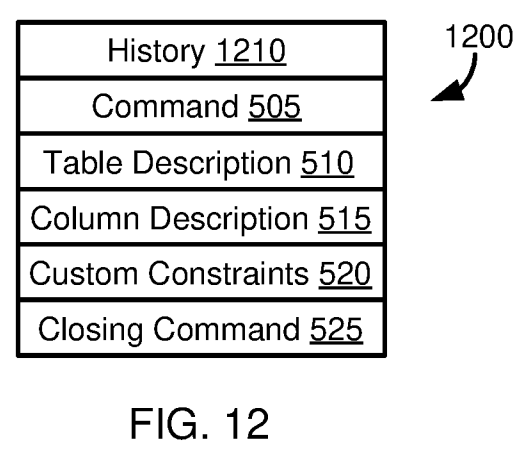

History 1210

Command 505

Table Description 510

Column Description 515

Custom Constraints 520

Closing Command 525

| ID (742a) | Last Name (742b) | Middle Name (742c) | First Name (742d) | Academic Title (742e) | Birth Date (742f) | Gender (742g) |
|---|---|---|---|---|---|---|
| 123456 | Smith | William | John | Dr. | 1985/07/15 | M |
| 789012 | Johnson | Lee | Sarah | | 1990/02/08 | F |
| ABCDEF | Brown | | Emily | Prof. | 1980/11/03 | F |
| 654321 | Davis | | Michael | | 1995/04/20 | M |
| XYZ123 | Wilson | | Robert | | 1998/09/12 | M |
| 987654 | Miller | | Emma | | 1987/12/05 | F |

1420

| PersonID (1132a) | E-Mail ID (1132b) | E-Mail (1132c) | IsDefault (1132d) |
|---|---|---|---|
| 123456 | E0001 | john.smith@example.com | yes |
| 123456 | E0002 | j.smith@example.com | no |
| 789012 | E0003 | sarah.johnson@example.com | yes |
| 789012 | E0004 | s.johnson@example.com | no |
| ABCDEF | E0005 | emily.brown@example.com | yes |
| ABCDEF | E0006 | e.brown@example.com | no |
| 654321 | E0007 | michael.davis@example.com | yes |
| 654321 | E0008 | m.davis@example.com | no |
| XYZ123 | E0009 | robert.wilson@example.com | yes |
| XYZ123 | E0010 | r.wilson@example.com | no |
| 987654 | E0011 | emma.miller@example.com | yes |
| 987654 | E0011 | e.miller@example.com | no |

| ID | Last Name | Middle Name | First Name | Academic Title | Birth Date | Gender |
|---|---|---|---|---|---|---|
| 123456 | Smith | James | John | Dr. | 1990/05/15 | M |
| ABCDEF | Johnson | | Alice | | 1985/12/20 | F |
| 987654 | Williams | Anne | Emily | | 1988/09/03 | F |
| XY789Z | Lee | | David | Prof. | 1995/02/10 | M |
| 246813 | Brown | | Michael | | 1992/07/25 | M |
| ZYX321 | Anderson | | Olivia | | 1994/11/30 | F |

1530

1532

| PersonID | E-Mail ID | E-Mail | IsDefault |
|---|---|---|---|
| 1001 | 1 | john.doe@example.com | yes |
| 1001 | 2 | johndoe_1985@gmail.com | no |
| 1002 | 1 | alice.smith@example.com | yes |
| 1002 | 2 | alice.smith@work.com | no |
| 1003 | 1 | michael.johnson@gmail.com | yes |
| 1004 | 1 | sarah94@example.com | yes |

FOR EACH association IN tables.getAllAssociations:
//Resolve cardinality of association as follows

1630

| Cardinality | Resolution |
| --- | --- |
| 1:1 | COPY table1.key to table2.key 1632 |
| 1:N | Create set with table1.key<br>Randomly draw from set for table2.key 1634 |
| N:1 | Create set with table2.key<br>Randomly draw from set for table1.key 1636 |
| N:M | UNION(table1.key,table2.key)<br>Randomly draw from UNION set, randomly draw two numbers (n, m), write draw to table1.key n times and to table2.key m times 1638 |

END FOR

| ID | Last Name | Middle Name | First Name | Academic Title | Birth Date | Gender |
|---|---|---|---|---|---|---|
| 123456 | Smith | John | Alex | Dr. | 1985/07/15 | M |
| 654321 | Johnson | Marie | Emily | Prof. | 1990/12/30 | F |
| 987654 | Lee | | David | | 1988/05/02 | M |
| 456123 | Williams | Anne | Mary | | 1995/09/21 | F |
| 789123 | Brown | | Michael | | 1982/03/10 | M |

1730

1732

| PersonID (Foreign Key) | E-Mail ID | E-Mail | IsDefault |
|---|---|---|---|
| 123456 | 001 | Smith.Alex@example.de | yes |
| 123456 | 002 | Alex.Smith@example.de | no |
| 654321 | 003 | Johnson.Emily@example.de | yes |
| 987654 | 004 | Lee.David@example.de | yes |
| 987654 | 005 | David.Lee@example.de | no |

New Schema

| ID | Last Name | Middle Name | First Name | Academic Title | Birth Date | Gender |
|---|---|---|---|---|---|---|
| 123456 | Smith | James | John | Dr. | 1990/05/15 | M |
| ABCDEF | Johnson | | Alice | | 1985/12/20 | F |
| 987654 | Williams | Anne | Emily | | 1988/09/03 | F |
| XY789Z | Lee | | David | Prof. | 1995/02/10 | M |
| 246813 | Brown | | Michael | | 1992/07/25 | M |
| ZYX321 | Anderson | | Olivia | | 1994/11/30 | F |

2120 Edit Data

| PersonID | E-Mail ID | E-Mail | IsDefault |
|---|---|---|---|
| 1001 | 1 | john.doe@example.com | yes |
| 1001 | 2 | johndoe_1985@gmail.com | no |
| 1002 | 1 | alice.smith@example.com | yes |
| 1002 | 2 | alice.smith@work.com | no |
| 1003 | 1 | michael.johnson@gmail.com | yes |
| 1004 | 1 | sarah94@example.com | yes |

2122 Edit Data

2126 Insert

FIG. 23

NATURAL LANGUAGE GENERATOR DATA GENERATION

FIELD

The present disclosure generally relates to data generation using a natural language generator.

BACKGROUND

Software programs can be exceedingly complex. In particular, enterprise level software applications can provide a wide range of functionality, and can process huge amounts of data, including in different formats. It is important that software functions as intended once it is deployed. The consequences of improperly functioning software can range reputational damage to a company, which can be a company that develops a software product or customers using that product, to life-or-death consequences.

Thus, software often undergoes rigorous testing before being put into productive use. This testing often relies on test data that simulates data used in a production environment, but which can also include data to test "corner" or "edge" cases, or to confirm that software is capable of handling erroneous or unexpected data values.

As a particular example, enterprise level software, such as Enterprise Resource Planning (EPR) software, is often quite complex and is designed to process large volumes of data. In particular, data is often stored in data artifacts of a data model or schema, where such data artifacts can have complex interrelations. For instance, a schema may include tables or views for a database, including definitions of such tables or views. A schema can also include artifacts in a virtual data model and their definitions, where artifacts in a virtual data model can be "mapped" to database artifacts. Views can be defined as join operations between two or more other tables or views, or using operations such as selection or projection operations. Tables and views can be subject to various constraints, including referential constraints, such as one defined by a foreign key relationship. A software application can operate by performing read or write operations on these data artifacts, including complex queries defined with respect to one or more artifacts.

Instance of data artifacts, such as tables or views generated from a particular definition, can each include dozens to hundreds of individual attributes, and can have millions or even billons of rows. The schema might include hundreds or even thousands of such data artifacts, including relationships and constraints therebetween.

Thus, populating a schema with sufficient data for software testing is a daunting task. Generating sufficient data manually is unrealistic. While some automated techniques can be used to generate data, the data volume can still be comparatively small, and the data values may not be sufficiently realistic for testing purposes. For example, the data may be too semantically or technically homogeneous or, not be semantically meaningful when considered as a collection. That is a record in one table or view, for example, may not be semantically correlated in what should be a corresponding record in another table or view. In part, this can result from a limited ability of prior data generation techniques to generate data for related data artifacts while honoring the associated referential constraints.

In some cases, data may exist in other production systems that can be used in testing for software development and other purposes. However, existing data may not completely overlap with a schema to be used for test purposes, and so existing data may lack values for attributes that are included in such a schema, or may lack data for entire data artifacts. In addition, increasingly, when data corresponds to individuals, such as customer or employers, the allowed use of such data, such as defined by data protection and privacy laws and regulations, may disallow its use for development or testing purposes. Rather, the data may be usable only for the benefit of a particular individual and particular uses they have authorized, or as limited by law. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for generating data that complies with a definition for a data artifact, such as attribute datatypes, attribute value constraints, or attribute referential constraints. In addition, the data is semantically appropriate for what a given attribute of the data artifact represents, such as a name or an email address. A schema stored in a computing system is accessed to retrieve a definition of a data artifact. The schema is parsed and information about attributes for the data artifact are added to a prompt. The prompt is submitted to a natural language generator. The natural language generator generates data sets, such as rows of a table, in response to the prompt. The data sets are then processed and inserted into a data repository.

In one aspect, the present disclosure provides a process for constructing a data generation prompt for a natural language generator, and inserting data values generated thereby into a data repository. A request is received to execute a computer-implemented data generation process. The computer-implemented data generation process generates data for one or more data artifacts specified in the request to execute the computer-implemented data generation process. The request includes identifiers of the one or more data artifacts.

The computer-implemented data generation process is executed. The computer-implemented data generation process includes retrieving a definition of a first data artifact from a stored schema definition using a first identifier of the first data artifact. The first identifier is specified in the request. The definition of the first data artifact includes a plurality of attributes.

Definition descriptive information for the plurality of attributes is retrieved from the stored schema. A prompt is created to be sent to a natural language generator during execution of the computer-implemented data generation process. A command to generate data for the first data artifact is added to the prompt. Descriptive information for at least a portion of the plurality of attributes of the first data artifact is added to the prompt.

The prompt is sent to the natural language generator for processing. Output provided by the natural language generator in response to the prompt is received. The output includes respective sets of values for the at least a portion of the plurality of attributes.

A computer implemented function is called to insert at least a portion of the respective sets of values for at some of the at least a portion of the plurality of attributes. The computer-implemented function is executed. Executing the computer-implemented function includes, for a first data insertion format, inserting into an instance of the data insertion format a second identifier of a data artifact into which the at least a portion of the respective sets of values will be inserted. For the first data insertion format, at least one respective set of values of the respective sets of values is inserted into the instance of the data insertion format. The instance of the data insertion format is caused to be processed by a data repository.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 is an example table definition that can be retrieved and parsed in generating a prompt to a natural language generator to perform a data generation task, as well as an example table generated according to the definition.

FIG. 8 is an example prompt that can be automatically generated, such as using the pseudocode of FIG. 6, and submitted to a natural language generator to cause the execution of a data generation task.

FIG. 9 is an example table of data produced by a natural language generator in response to the prompt of FIG. 8.

FIG. 10 is an example insert operation that can cause the data of the table of FIG. 9 to be inserted into a data repository, such as a database.

FIG. 12 is a diagram of a command structure or template that can be used to generate data for related data artifacts, according to a particular implementation of disclosed techniques.

FIG. 14 illustrates example data for example tables produced using the pseudocode of FIGS. 13A and 13B.

FIG. 15 illustrates example data for example tables, where the example data for one table does not satisfy a referential constraint imposed by data of another table.

FIG. 16 provides example pseudocode for an example technique for modifying data of one or more data artifacts to satisfy one or more referential constraints between the data artifacts.

FIG. 17 illustrates data for the tables of FIG. 15 after execution of the pseudocode of FIG. 16.

FIG. 23 illustrates a user interface where a user can view and edit data generated using disclosed techniques.

DETAILED DESCRIPTION

Example 1—Overview

Figure 1:
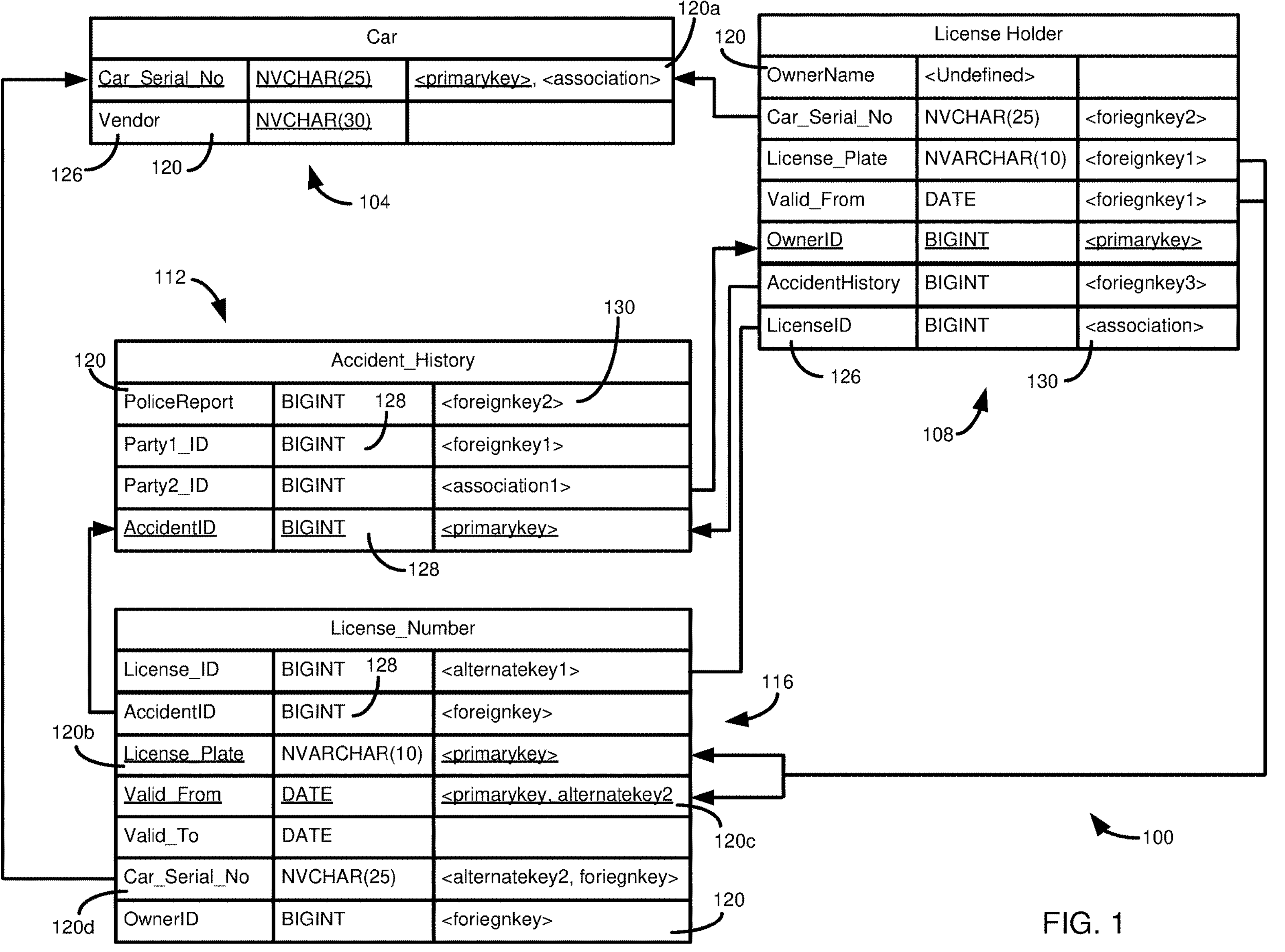
FIG. 1 is a diagram of a database schema showing technical relationships between at least a portion of database tables in the schema.

Software programs can be exceedingly complex. In particular, enterprise level software applications can provide a wide range of functionality, and can process huge amounts of data, including in different formats. It is important that software functions as intended once it is deployed. The consequences of improperly functioning software can range reputational damage to a company, which can be a company that develops a software product or customers using that product, to life-or-death consequences.

Thus, software often undergoes rigorous testing before being put into productive use. This testing often relies on test data that simulates data used in a production environment, but which can also include data to test "corner" or "edge" cases, or to confirm that software is capable of handling erroneous or unexpected data values.

As a particular example, enterprise-level software, such as Enterprise Resource Planning (ERP) software, is often quite complex and is designed to process large volumes of data. In particular, data is frequently stored in instances of data artifacts within a data model or schema, where these data artifacts can have complex interrelationships. For instance, a schema may define various data artifacts, including tables or views for a database or objects in a virtual data model. Instances of these tables, views, or objects are created based on these definitions, and these instances store data in accordance with their respective definitions.

Although the present disclosure generally uses examples of database tables or views, data can be defined and stored in other manners, including using CSON/JSON objects or other types of key-value storage.

A schema can also include artifacts in a virtual data model and their definitions, where artifacts in a virtual data model can be "mapped" to database artifacts. Views can be defined as join operations between two or more other tables or views, or using operations such as selection or projection operations. Tables and views can be subject to various constraints, including referential constraints, such as one defined by a foreign key relationship. A software application can operate by performing read or write operations on these data artifacts, including complex queries defined with respect to one or more artifacts.

Instance of data artifacts, such as tables or views generated from a particular definition, can each include dozens to hundreds of individual attributes, and can have millions or even billons of rows. The schema might include hundreds or even thousands of such data artifacts, including relationships and constraints therebetween.

Thus, populating a schema with sufficient data for software testing is a daunting task. Generating sufficient data manually is unrealistic. While some automated techniques can be used to generate data, the data volume can still be comparatively small, and the data values may not be sufficiently realistic for testing purposes. For example, the data may be too semantically or technically homogeneous or, not be semantically meaningful when considered as a collection. That is a record in one table or view, for example, may not be semantically correlated in what should be a corresponding record in another table or view. In part, this can result from a limited ability of prior data generation techniques to generate data for related data artifacts while honoring the associated referential constraints.

In some cases, data may exist in other production systems that can be used in testing for software development and other purposes. However, existing data may not completely overlap with a schema to be used for test purposes, and so existing data may lack values for attributes that are included in such a schema, or may lack data for entire data artifacts. In addition, increasingly, when data corresponds to individuals, such as customer or employers, the allowed use of such data, such as defined by data protection and privacy laws and regulations, may disallow its use for development or testing purposes. Rather, the data may be usable only for the benefit of a particular individual and particular uses they have authorized, or as limited by law. Accordingly, room for improvement exists.

The present disclosure provides techniques that can be used to generate data, including for use during software testing. A natural language generator (NLG), such as a large language model (LLM), is queried to produce test data. NLGs have a wide range of knowledge and sophisticated linguistic capabilities, and are thus able to produce large amounts of test data that are semantically coherent between numerous data artifacts that store such data. Further, the ease of interacting with NLGs allows users to easily customize a data generation process.

Generally, the present disclosure provides an automated or semi-automated process for generating data. For example, a user can select one or more data artifact definitions for which data should be generated, including selecting data artifacts for an entire data schema. Techniques are described that can be used to generate data for single data artifacts. Techniques are also provided for "linking" such data for two or more data artifacts together to reflect the relationships (such as defining referential constraints) of the data artifacts in a schema. Techniques are also provided for generating data that has a higher degree of "semantic coherence" between related data artifacts.

Disclosed techniques involve automatically generating a query to a natural language generator. Parts of the prompt can be consistent between data generation requests. For example, a general definition of the task, including a desired output format, can be common for all requests. Other parts of the prompt are automatically and dynamically generated for a specific task request. For example, a task request can identify one or more data artifacts. A computer-implemented process can then retrieve a definition of the data artifact and use that specific information to generate other parts of the prompt for the specific task request.

In some cases, a data generation task, or a series of data generation tasks, can be used to generate data for related data artifacts, where the data provided by the natural language generator is, or is later modified to be, consistent with relational constraints between the data artifacts. In one implementation, a second task to generate data for a second data artifact involves providing data generated from a first task to generate data for a first, related, data artifact and an explanation in a prompt for the second task of the nature of the constraint. In other cases, data for related data artifacts can initially be generated without considering relational constraints. Afterwards, data for related data artifacts can be "harmonized," including using rules that account for a cardinality relationship between the data artifacts.

The present disclosure also provides example user interfaces for defining data generation tasks or for editing data generated from a data generation task. Data generated from a data generation task can be automatically inserted into a data repository, such as inserting the data into appropriate tables of a relational database.

Disclosed techniques thus provide for a technical, computer-implemented process that use a natural language generator to generate data, which can be "realistic" for a particular use case. The generation of prompts for a natural language generator can be automated, including filling in the prompt using information retrieved from a schema definition for specific data artifacts identified in a task request. The disclosed techniques allow the generation of data that cannot practically be performed by a human, and in a manner different than how a human might attempt to generate such data. The generated data allows for more accurate development and testing of software applications.

Example 2—Example Database Schema with Technical Relationships

FIG. 1 is an example entity-relation (ER) type diagram illustrating a data schema 100, or artifact definition, related to a driver's accident history. The schema 100 (which can be part of a larger schema, the other components not being shown in FIG. 1) can include a table 108 associated with a license holder (e.g., an individual having a driver's license), a table 112 representing an accident history, a table 116 associated with a license, and a table 104 representing cars (or other vehicles).

Each of the tables 104, 108, 112, 116 has a plurality of attributes 120 (although, a table may only have one attribute in some circumstances). For a particular table 104, 108, 112, 116, one or more of the attributes 120 can serve as a primary key—uniquely identifying particular records in the tuple and being designated as the main method of accessing tuples in the table. For example, in the table 104, the Car_Serial_No attribute 120*a* serves as the primary key. In the table 116, the combination of attributes 120*b* and 120*c* together serve as the primary key.

A table can reference records associated with the primary key of another table through the use of a foreign key. For example, the license number table 116 has an attribute 120*d* for a Car_Serial_No in table 116 that is a foreign key and is associated with the corresponding attribute 120*a* of table 104. The use of a foreign key can serve various purposes. The foreign key can link particular tuples in different tables. For example, a foreign key value of 8888 for the attribute 120*d* would be associated with a particular tuple in table 104 having that value for attribute 120*a*. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, which can serve to uniquely identify tuples, but which are not primary keys. Table 116, for instance, has an alternate key that is formed from attribute 120*c* and attribute 120*d*. Thus, a unique tuple can be accessed in the table 116 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 104, 108, 112, 116, and the name 126 and datatype 128 of their associated attributes 120. Schema information may also include at least some of the information conveyable using the flag 130, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 3—Example Table Elements Including Semantic Identifiers

Figure 2:
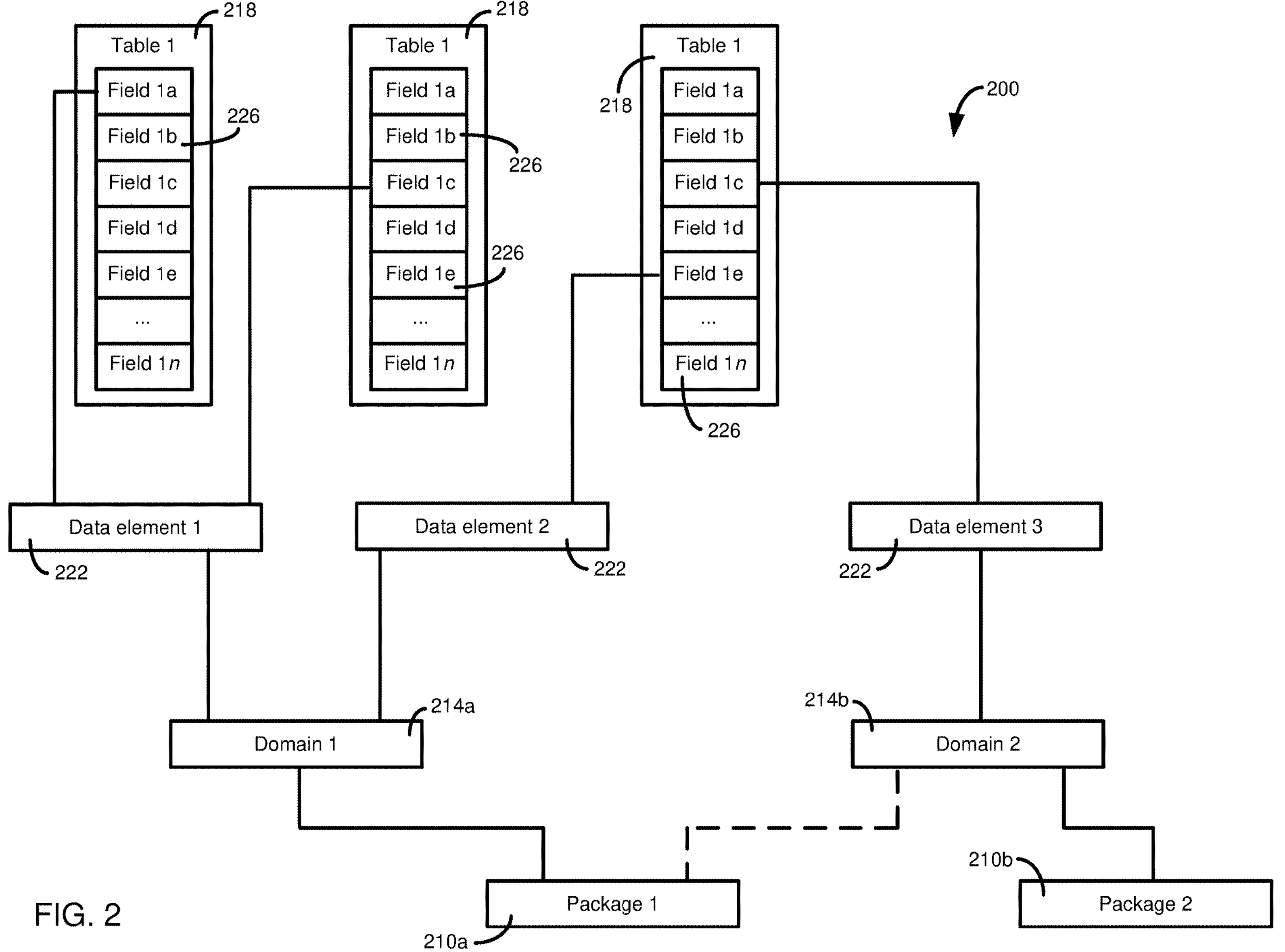
FIG. 2 is a schematic diagram illustrating relationships between table elements that can be included in a data dictionary, or otherwise used to define database tables.

FIG. 2 is a diagram illustrating elements of a database schema 200 and how they can be interrelated. In at least some cases, the database schema 200 can be maintained other than at the database layer of a database system. That is, for example, the database schema 200 (or virtual data model) can be independent of the underlying database, including a schema used for the underlying database. Typically, the database schema 200 is mapped to a schema of the database layer (e.g., schema 100 of FIG. 1), such that records, or portions thereof (e.g., particular values of particular fields) can be retrieved through the database schema 200.

The database schema 200 can include one or more packages 210 (shown as packages 210*a*, 210*b*). A package 210 can represent an organizational component used to categorize or classify other elements of the schema 200. For example, the package 210 can be replicated or deployed to various database systems. The package 210 can also be used to enforce security restrictions, such as by restricting access of particular users or particular applications to particular schema elements.

A package 210 can be associated with one or more domains 214 (i.e., a particular type of semantic identifier or semantic information). In turn, a domain 214 can be associated with one or more packages 210. For instance, domain 1, 214*a*, is associated only with package 210*a*, while domain 2, 214*b*, is associated with package 210*a* and package 210*b*. In at least some cases, a domain 214 can specify which packages 210 may use the domain. For instance, it may be that a domain 214 associated with materials used in a manufacturing process can be used by a process-control application, but not by a human resources application.

In at least some implementations, although multiple packages 210 can access a domain 214 (and database objects that incorporate the domain), a domain (and optionally other database objects, such as tables 218, data elements 222, and fields 226, described in more detail below) is primarily assigned to one package. Assigning a domain 214, and other database objects, to a unique package can help create logical (or semantic) relationships between database objects. In FIG. 2, an assignment of a domain 214 to a package 210 is shown as a solid line, while an access permission is shown as a dashed line. So, domain 214*a* is assigned to package 210*a*, and domain 214*b* is assigned to package 210*b*. Package 210*a* can access domain 214*b*, but package 210*b* cannot access domain 214*a*.

Note that at least certain database objects, such as tables 218, can include database objects that are associated with multiple packages. For example, a table 218, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 214 (that is, the domains can provide further semantic context for database objects that are associated with an object of another package, rather than being assigned to a common package).

As will be explained in more detail, a domain 214 can represent the most granular unit from which database tables 218 or other schema elements or objects can be constructed. For instance, a domain 214 may at least be associated with a datatype. Each domain 214 is associated with a unique name or identifier, and is typically associated with a description, such as a human readable textual description (or an identifier than can be correlated with a human readable textual description) providing the semantic meaning of the domain. For instance, one domain 214 can be an integer value representing a phone number, while another domain can be an integer value representing a part number, while yet another integer domain may represent a social security number. The domain 214 thus can held provide common and consistent use (e.g., semantic meaning) across the schema 200. That is, for example, whenever a domain representing a social security number is used, the corresponding fields can be recognized as having this meaning even if the fields or data elements have different identifiers or other characteristics for different tables.

The schema 200 can include one or more data elements 222. Each data element 222 is typically associated with a single domain 214. However, multiple data elements 222 can be associated with a particular domain 214. Although not shown, multiple elements of a table 218 can be associated with the same data element 222, or can be associated with different data elements having the same domain 214. Data elements 222 can serve, among other things, to allow a domain 214 to be customized for a particular table 218. Thus, the data elements 222 can provide additional semantic information for an element of a table 218.

Tables 218 include one or more fields 226, at least a portion of which are mapped to data elements 222. The fields 226 can be mapped to a schema of a database layer, or the tables 218 can be mapped to a database layer in another manner. In any case, in some embodiments, the fields 226 are mapped to a database layer in some manner. Or, a database schema can include semantic information equivalent to elements of the schema 200, including the domains 214.

In some embodiments, one or more of the fields 226 are not mapped to a domain 214. For example, the fields 226 can be associated with primitive data components (e.g., primitive datatypes, such as integers, strings, Boolean values, character arrays, etc.), where the primitive data components do not include semantic information. Or, a database system can include one or more tables 218 that do not include any fields 226 that are associated with a domain 214. However, the disclosed technologies can include a schema 200 (which can be separate from, or incorporated into, a database schema) that includes a plurality of tables 218 having at least one field 226 that is associated with a domain 214, directly or through a data element 222.

Example 4—Example Data Dictionary Components

Schema information, such as information associated with the schema 200 of FIG. 2, can be stored in a repository, such as a data dictionary. In at least some cases the data dictionary is independent of, but mapped to, an underlying relational database. Such independence can allow the same database schema 200 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 3:
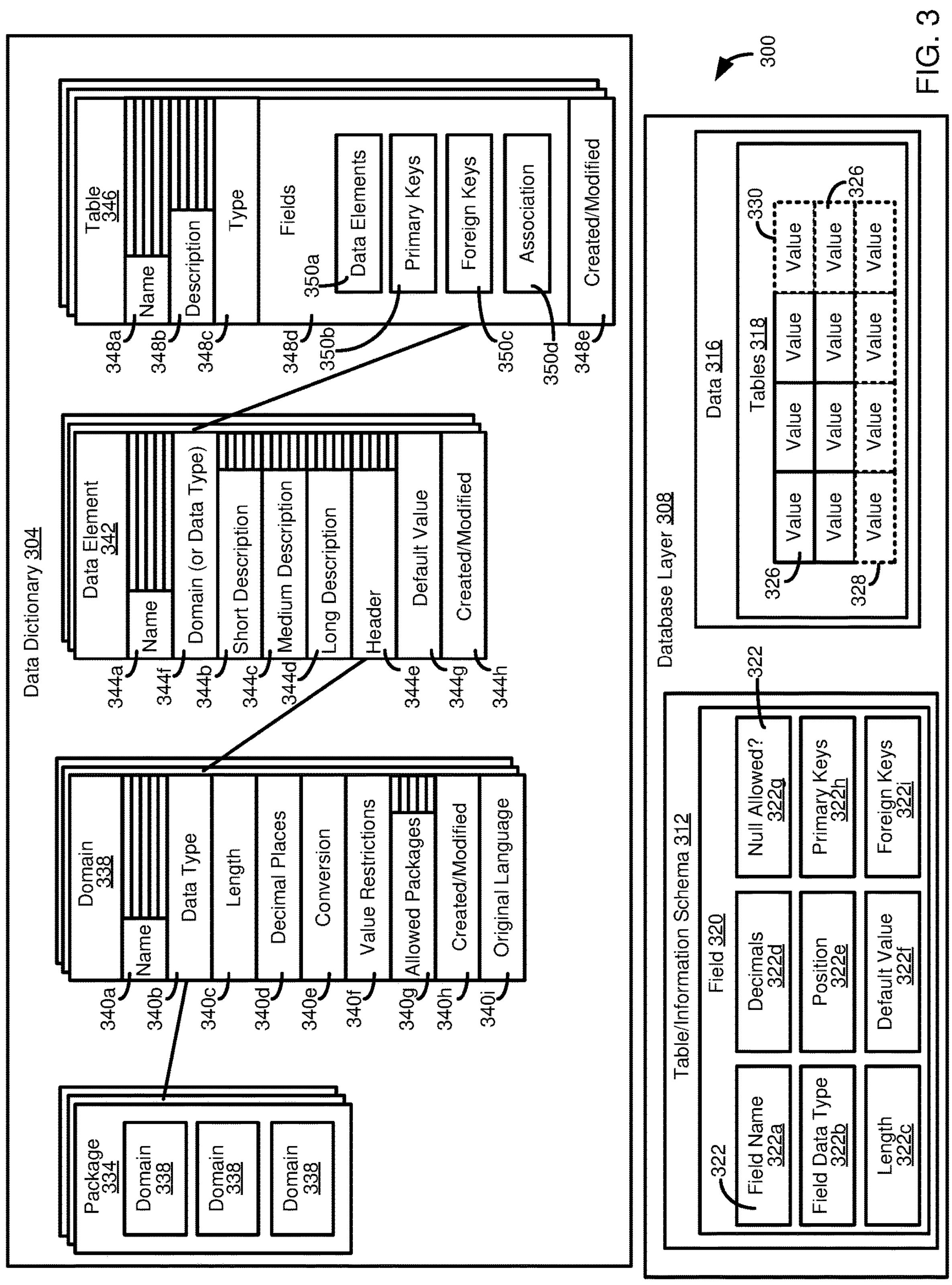
FIG. 3 a schematic diagram illustrating components of a data dictionary and components of a database layer.

FIG. 3 illustrates a database environment 300 having a data dictionary 304 that can access, such as through a mapping, a database layer 308. The database layer 308 can include a schema 312 (e.g., an INFORMATION_SCHEMA as in PostgreSQL) and data 316, such as data associated with tables 318. The schema 312 includes various technical data items/components 322, which can be associated with a field 320, such as a field name 322*a* (which may or may not correspond to a readily human-understandable description of the purpose of the field, or otherwise explicitly describe the semantic meaning of values for that field), a field data type 322*b* (e.g., integer, varchar, string, Boolean), a length 322*c* (e.g., the size of a number, the length of a string, etc., allowed for values in the field), a number of decimal places 322*d* (optionally, for suitable datatypes, such as, for a float with length 6, specifying whether the values represent XX.XXXX or XXX.XXX), a position 322*e* (e.g., a position in the table where the field should be displayed, such as being the first displayed field, the second displayed field, etc.), optionally, a default value 322*f* (e.g., "NULL," "0," or some other value), a NULL flag 322*g* indicating whether NULL values are allowed for the field, a primary key flag 322*h* indicating whether the field is, or is used in, a primary key for the table, and a foreign key element 322*i*, which can indicate whether the field 320 is associated with a primary key of another table, and, optionally, an identifier of the table/field referenced by the foreign key element. A particular schema 312 can include more, fewer, or different technical data items 322 than shown in FIG. 3.

The tables 318 are associated with one or more values 326. The values 326 are typically associated with a field 320 defined using one or more of the technical data elements 322. That is, each row 328 typically represents a unique tuple or record, and each column 330 is typically associated with a definition of a particular field 320. A table 318 typically is defined as a collection of the fields 320, and is given a unique identifier.

The data dictionary 304 includes one or more packages 334, one or more domains 338, one or more data elements 342, and one or more tables 346, which can at least generally correspond to the similarly titled components 210, 214, 222, 218, respectively, of FIG. 2. As explained in the discussion of FIG. 2, a package 334 includes one or more (typically a plurality) of domains 338. Each domain 338 is defined by a plurality of domain elements 340 (shown as domain elements 340*a*-340*i*). The domain elements 340 can include one or more names 340*a*. The names 340*a* serve to identify, in some cases uniquely, a particular domain 338. A domain 338 includes at least one unique name 340*a*, and may include one or more names that may or may not be unique. Names which may or may not be unique can include versions of a name, or a description, of the domain 338 at various lengths or levels of detail. For instance, names 340*a* can include text that can be used as a label for the domain 338, and can include short, medium, and long versions, as well as text that can be specified as a heading. Or, the names 340*a* can include a primary name or identifier and a short description or field label that provides human understandable semantics for the domain 338.

In at least some cases, the data dictionary 304 can store at least a portion of the names 340*a* in multiple language, such as having domain labels available for multiple languages. In embodiments of the disclosed technologies, when domain information is used for identifying relationships between tables or other database elements or objects, including searching for particular values, information, such as names 340*a*, in multiple languages can be searched. For instance, if "customer" is specified, the German and French portion of the names 340*a* can be searched as well as an English version.

The domain elements 340 can also include information that is at least similar to information that can be included in the schema 312. For example, the domain elements 340 can include a data type 340*b*, a length 340*c*, and a number of decimal places 340*d* associated with relevant data types, which can correspond to the technical data elements 322*b*, 322*c*, 322*d*, respectively. The domain elements 340 can include conversion information 340*e*. The conversion information 340*e* can be used to convert (or interconvert) values entered for the domain 338 (including, optionally, as modified by a data element 342). For instance, conversion information 340*e* can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 338 can be stored in a repository, such as a field catalog.

The domain elements 340 can include one or more value restrictions 340*f*. A value restriction 340*f* can specify, for example, that negative values are or are not allowed, or particular ranges or threshold of values that are acceptable for a domain 338. In some cases, an error message or similar indication can be provided as a value is attempted to be used with a domain 338 that does not comply with a value restriction 340*f*. A domain element 340*g* can specify one or more packages 334 that are allowed to use the domain 338.

A domain element 340*h* can specify metadata that records creation or modification events associated with a domain element 338. For instance, the domain element 340*h* can record the identity of a user or application that last modified the domain element 340*h*, and a time that the modification occurred. In some cases, the domain element 340*h* stores a larger history, including a complete history, of creation and modification of a domain 338.

A domain element 340*i* can specify an original language associated with a domain 338, including the names 340*a*. The domain element 340*i* can be useful, for example, when it is to be determined whether the names 340*a* should be converted to another language, or how such conversion should be accomplished.

Data elements 342 can include data element fields 344 (shown as 344*a*-344*h*), at least some of which can be at least generally similar to domain elements 340. For example, a data element field 344*a* can correspond to at least a portion of the name domain element 340*a*, such as being (or including) a unique identifier of a particular data element 342. The field label information described with respect to the name domain element 340*a* is shown as separated into a short description label 344*b*, a medium description label 344*c*, a long description label 344*d*, and a header description 344*e*. As described for the name domain element 340*a*, the labels and header 344*b*-344*e* can be maintained in one language or in multiple languages.

A data element field 344*f* can specify a domain 338 that is used with the data element 342, thus incorporating the features of the domain elements 340 into the data element. Data element field 344*g* can represent a default value for the data element 342, and can be at least analogous to the default value 322*f* of the schema 312. A created/modified data element field 344*h* can be at least generally similar to the domain element 340*h*.

Tables 346 can include one or more table elements 348 (shown as 348*a*-348*e*). At least a portion of the table elements 348 can be at least similar to domain elements 340, such as table element 348*a* being at least generally similar to domain element 340*a*, or data element field 344*a*. A description table element 348*b* can be analogous to the description and header labels described in conjunction with the domain element 340*a*, or the labels and header data element fields 344*b*-344*e*. A table 346 can be associated with a type using table element 348*c*. Example table types include transparent tables, cluster tables, and pooled tables, such as used as in database products available from SAP SE of Walldorf, Germany.

Tables 346 can include one or more field table elements 348*d*. A field table element 348*d* can define a particular field of a particular database table. Each field table element 348*d* can include an identifier 350*a* of a particular data element 342 used for the field. Identifiers 350*b*-350*d*, can specify whether the field is, or is part of, a primary key for the table (identifier 350*b*), or has a relationship with one or more fields of another database table, such as being a foreign key (identifier 350*c*) or an association (identifier 350*d*).

A created/modified table element 348*e* can be at least generally similar to the domain element 340*h*.

Example 5—Example Artifact Definition

Figure 4:
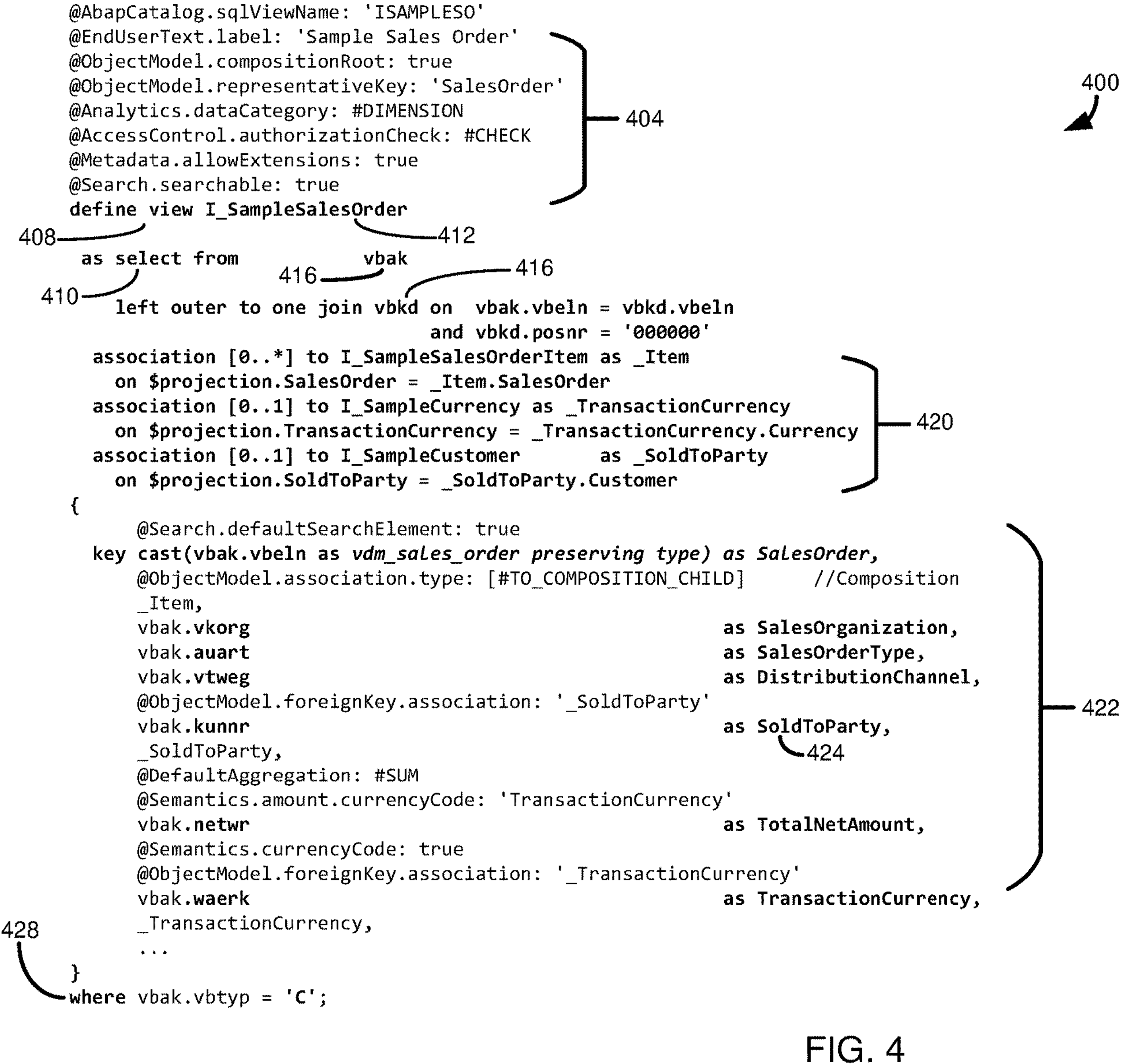
FIG. 4 is code for an example metadata model for a database view of a virtual data model.

FIG. 4 illustrates an example data artifact definition 400. The data artifact definition 400, in particular, represents a view, such as a Core Data Services view of SAP SE, of Walldorf, Germany, and be expressed in a format such as CSN. The artifact definition 400 can include a variety of different components, at least some of which can be considered to be artifact definitions. That is, the artifact definition 400 can be a model that is based at least in part on multiple sub-models. The sub-models can specify particular aspects of the overall artifact definition 400.

The artifact definition 400 can optionally include one or more annotations 404. An annotation can be a metadata component that can be added to an artifact definition. For example, a provider may supply a base model, and individual users or customers may wish to add metadata that is specific to their operating environment and use cases. The ability to add annotations can thus enhance usability by allowing for custom metadata elements, without impacting other users of a base artifact definition. Annotations can be specified for different software layers or frameworks.

In the example shown, annotations 404 can be indicated as annotations using particular syntax elements, such as by preceding an annotation with the "@" symbol. In at least some cases, annotations 404 can also be indicated by placing them in the appropriate portion of an artifact definition, such as in a header section or another section designated for annotations. In some cases, annotations 404 can reference other artifact definitions, such as an artifact definition of a data source, or can reference a data source that is associated with an artifact definition. In either event, such an association 404 can create a dependency between the artifact definition 400 and the other artifact definition/data source.

The artifact definition 400 can include instructions 408, in this case a SQL statement 410, defining a core artifact definition/object having an identifier 412 (which can be used, for example to later access or activate, such as to instantiate, the artifact definition). In particular, the instructions 408 shown define a view. The annotations 404 further specify properties of the view, as do other portions of the artifact definition 400 that will be further described.

The instructions 408 can specify one or more data sources 416. Data sources 416 can define data to which at least a portion of the metadata of the artifact definition 400 will apply, and can also supply additional metadata for the artifact definition 400. Note that the artifact definition 400 can be, in at least a sense, dependent on referenced data sources 416. For example, if the artifact definition 400 relies on particular expected data or metadata of a data source 416, the artifact definition may be unusable, have performance issues, or provide incorrect results if the referenced data sources do not include expected data or metadata, or are otherwise inconsistent with how the data source is used in the artifact definition. As shown, the data sources 416 includes two tables, "vbak" and "vbkd." These tables will typically include metadata features such as one or more fields, where each field is associated with a data type, designations of a primary key, and optionally associations with other database components, such as association or foreign key relationships with other database tables.

The artifact definition 400 can optionally include specifications of one or more associations 420. An association 420 can define a relationship to another entity. An association 420 can be processed during the use of the artifact definition 400, such as being converted to a SQL expression such as a JOIN. Unlike other conditions or elements that are included in the artifact definition 400, associations can define a relationship that can at least in some cases be optional, such as being selectively activated depending upon how the artifact definition is accessed. For example, an association 420 can be converted to a JOIN condition that uses a table provided in a SELECT statement that references the artifact definition 400.

The artifact definition 400 can include one or more components 422 that specify how data retrieved using the artifact definition should be processed, including to generate values that are associated with other metadata elements of the artifact definition. Processing can include calculating values, such as using a formula specified in, or referenced by, the artifact definition 400.

The artifact definition 400 can optionally include additional components, such as one or more conditions 428, or other operations, such as aggregations, unions, etc., including such operations that are typically supported by a database query language.

Example 6—Example Process for Generating Data Generation Prompt for Single Data Artifacts In an example, the present disclosure provides for a computer implemented technique, such as a method of an abstract data type or a function, for generating data for a single data artifact. In the example, the data artifact corresponds to a relational database table. The method can be defined as:

METHOD get_demo_data (Table t, Integer i) RETURNS DataSet

Where t is the table for which data is to be generated, integer i is the number of records to be generated, and a DataSet is an instance of a datatype for holding generated data. For example, the datatype for DataSet can be a datatype that can store values in a similar manner as the row/column format of a table. The datatype can be a multidimensional array in some implementations. In other implementations, a DataSet can be a structured data format or representation, such as JSON, XML, or CSV. As will be further described, data from the method can be inserted into a schema using appropriate commands. In the case of a schema for a relational database, INSERT operations can be used to insert values from the DataSet result of the method into appropriate database data artifacts.

In this way, the method can be agnostic as to any particular "location" or use of the data, such as a specific database system where the data will be stored and used. INSERT operations, or similar functionality, can be configured to use data stored in the DataSet. In other cases, the method can be configured to generate data for a specific use scenario and use the data, or can the method can include the INSERT or analogous operations, rather than having this performed as a separate, discrete operation.

In a particular implementation, the method can include steps of command building, command execution, output verification, INSERT creation, and INSERT execution. In executing one or more of these steps, the method can use preexisting information about a data artifact. To simplify explanation of disclosed innovations, particular examples are described that involve the use of data artifacts in the form of database tables. However, as discussed, disclosed techniques can be applied to other types of data artifacts, including artifacts of a virtual data model.

As described in Examples 2-4, information about data artifacts in a system is typically stored in a repository, such as a data dictionary or Information Schema, which can be specific examples of a "schema definition." Schema definitions, which encompass metadata or information about data artifact definitions (such as tables, views, procedures, functions, and other database objects) within a database or other data repository, are stored and managed in various ways. Many relational database management systems (RDBMS) maintain a system catalog or information schema, housing metadata about the database's structure, including tables, views, columns, indexes, constraints, and other objects, providing a standardized means to access schema information.

Data modeling tools like Erwin, IBM Data Architect, or SAP PowerDesigner allow users to visually create and manage schema definitions, often generating database scripts or DDL (Data Definition Language) statements to instantiate the schema objects in the database. Schema definitions may reside in script files or source code repositories in the form of DDL statements or SQL scripts that can be executed to create or modify database objects. Certain databases have proprietary metadata repositories or data dictionaries dedicated to storing schema information, which may offer specialized features for managing such definitions.

Application frameworks, such as those using ORM (Object-Relational Mapping) like Hibernate or Entity Framework, can codify schema information within code through classes or annotations, with the ORM framework subsequently generating the corresponding database schema based on these definitions.

Virtual data models, such as SAP CDS or Virtual Data Models based on ABAP objects, provide high-level, abstract representations of data within organizations, abstracting data sources and defining their structure, relationships, and business logic without specifying physical storage details. In addition to interacting with underlying databases, they help with data integration, harmonization, and presentation, including offering a unified view of data from diverse sources. As a more specific example, in SAP systems, BusinessObjects, a type of logical data object, can be defined with respect to data artifacts in the CDS virtual data model, which are in turn defined with respect to (or are used to define) data artifacts in a database that actually stores data. Applications and users can interact with the higher-level objects, such as logical data objects, and data read and write requests can be "translated" to be performed at the database levels. As can be seen, multiple layers involved in this process can have their own respective schemas and schema definitions, where typically there is some relationship, mapping, or other correspondence between such schema definitions.

The term "schema definition" broadly encompasses these methods of storing metadata about data artifact definitions within a database, capturing the structural characteristics of these objects regardless of whether they contain actual data instances.

Information in the scheme definition can be used during execution of the data generation method. Returning to the example of a database table, a schema definition that includes a definition for the table can store information such as the table name or identifier, and optionally other names or descriptive information. In some cases, table names, particularly at the database level, can have short, and fairly cryptic names. The other names/descriptive information can provide information about a table that is more readily understandable by humans.

For the table, the schema definition also typically stores information for columns (also referred to as fields or attributes) of a table, including a column name or identifier, and, as with the table itself, descriptive information for a given column. A schema definition can optionally store more "sophisticated" information, such as data format definitions or example data instances for the column.

Figure 5:
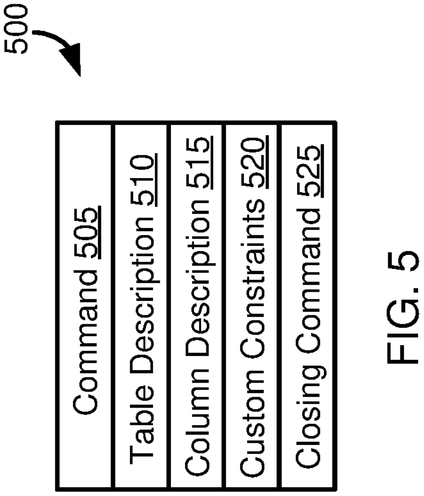
FIG. 5 is a diagram of a command structure or template that can be used to generate a prompt to a natural language generator to perform a data generation task.

The command building stage of the method can build a command having various components, such as those shown in FIG. 5 for an example command structure 500. The command structure 500 includes a static command 505. The static command is a beginning instruction to an NLG in a data generation task. The command structure 500 incudes dynamically generated components corresponding to a table description 510 and column descriptions 515. The table description 510 and column descriptions 515 customize the commands structure for a particular task/use case associated with a call of the data generation method.

Optionally, custom constraints 520 can be provided for the command structure 500. Custom constraints 520 can provide additional details to an NLG on what values are or are not desired, and can include specific restrictions/instructions on how data for a column should be generated, including with respect to other columns of the table.

The command structure 500 typically includes a closing command 525, which is often also statically defined. The closing command 525 can include instructions to the NLG on how a response should be provided, such as a particular format for result values or specifying that only the result values should be provided.

Figure 6:
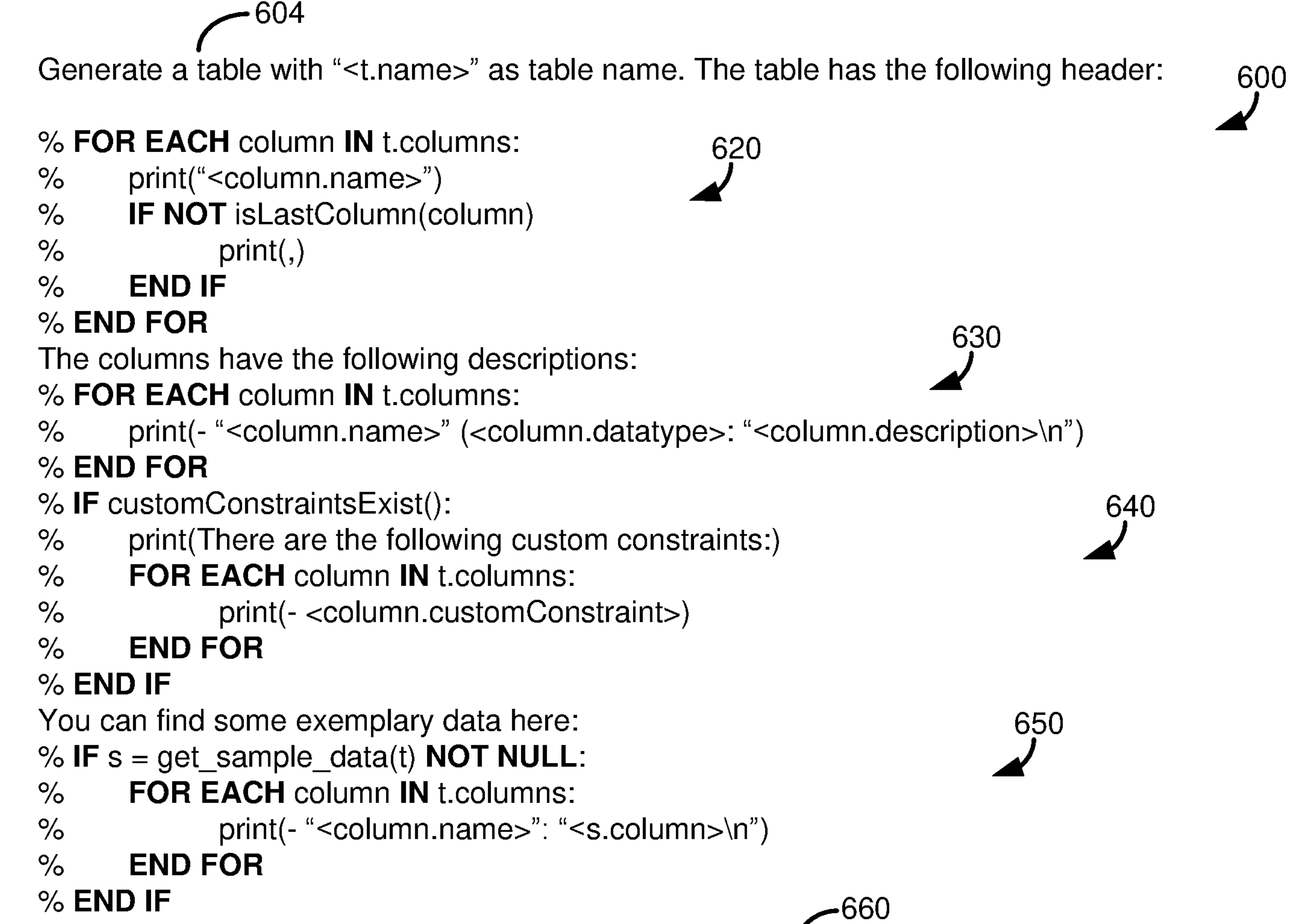
FIG. 6 is example pseudocode to generate a prompt to a natural language generator to perform a data generation task, including using the command structure or template of FIG. 5.

FIG. 6 provides example pseudocode 600 implementing a command structure 500 of FIG. 5. The pseudocode 600 writes a prompt/query to an NLG to generate data for a particular table having a particular definition in a schema description. In the pseudocode 600, code portions are prefixed with "%." Variable values are printed to the prompt if shown as within "<" and ">" characters. Unprefaced text is written to the prompt.

Line 604 of the pseudocode 600 corresponds to the static command 505 of the command structure 500. The line 604 provides the general task description and well as providing a brief explanation of the information that will follow in the prompt being generated.

In section 620 of the pseudocode 600, table columns associated with an input table t are determined, such as from a schema definition including a definition or description of the table. Section 630 corresponds to the column description component 515 of the command structure 500. The column names are printed to the prompt being generated. Section 630 of the pseudocode 600 includes a loop that prints column descriptions to the prompt. In this case, the column descriptions correspond to a datatype defined for a respective column of the table t.

Section 640 of the pseudocode 600 checks to see if custom constraints, component 520 of the command structure 500, have been defined. In this example, custom constraints are defined on a per-column basis, and are checked for each column. In other scenarios, in addition to, in place of, custom constraints on individual columns, constraints can be placed on the overall table. Further, when a custom constraint is specified for a column, the constraints can be expressed with respect to one or more other table columns.

As explained above, in some cases, examples of data for a table or for specific table columns can be specified in a schema definition. Section 650 of the pseudocode 600 checks to see if sample data exists for the table. If so, a loop is executed to print sample data for particular table columns to the prompt.

Line 660 provides the closing command 525 of the command structure 500. In this case, the line 660 specifies the number of records to be generated (based on the value of argument i provided when the method is called) and specifies that only the data values are of interest. NLGs can provide verbose responses, so the closing command of line 660 helps focus the NLG to limit the response to the desired data. Among other things, limiting the response to only the generated data can make it easier to parse the response of the NLG, including for generating INSERT statements to incorporate the data into a relational database table or other data artifact.

Although not shown, the pseudocode 600 can be modified to include a command to print a table description, corresponding to component 510 of the command structure 500, to the prompt. In some cases, the command can be included in, or proximate, line 604 of the pseudocode 600. Example pseudocode for performing this functionality is:

```
IF table.descriptionExists( ):
% print(The table description is:)
% print(-<table.description>
```

Example 7—Single Data Artifact Data Generation Example

FIGS. 7, 8, and 9 provide a particular example of how the command structure 500 of FIG. 5 and the pseudocode 600 of FIG. 6 can be used to generate data. FIG. 7 provides a definition 700 for a "BusinessPartner" table. The definition 700 includes the name of the table (BusinessPartner), and the columns defined for the table, their datatype, and a comment that describes the purpose of the column, the format of values in the column, or the type of values that are included in the column. An example 740 of the table of the definition 700 is provided, having columns 742*a*-742*g* from the definition, and having example values complying with the datatypes and comments from the definition.

For the table definition 700, an example method call to generate table data can be:

get_demo_data (BusinessPartner, 5)

The call of the method can generate a prompt 800 shown in FIG. 8. A table 900 of example results from submitting the prompt 800 to an NLG is shown in FIG. 9. Note that the table 900 includes five records (rows), as provided in the function call and inserted into the prompt 800.

Note that the data values for columns 910*a*-910*g* of the table 900 are "realistic." That is, for example, the names of columns 910*b*-910*d* have values that are common first names, last names, and middle names. The values do not include entries where a name that is commonly associated with being a last name is instead provided as a first name. In addition, the values for a given record of the table are consistent with the various values for the columns 910*a*-910*g*. In particular, note that records for females have first names that are commonly associated with female names, while "typical" male names are used in rows corresponding to male entries/BusinessPartners.

Further, note that, while no specific example values were provided for the "Academic Title" column 910*e*, the NLG added meaningful/realistic academic titles to certain example records.

The values also comply with datatypes and constraints specified in the prompt 800. As a particular example, note that the values for the column 910*g* correspond to the code list of valid values (M, F, X) specified in the table definition 700.

A parsing routine can be used to analyze data provided in a response from an NLG, such as the data in the table 900. The parsing routine can convert individual rows of the table 900 into insert statements that can be executed by a database. An example insert statement 1000 is provided in FIG. 10. The parsing routine can, among other operations, determine whether the data complies with at least certain specifications of the table definition 700, such as complying with length, datatype, or value restrictions. If an error is detected, such as because certain data cannot be processed, an error can be returned, or the prompt can be resent to the NLG. In some cases, the prompt can be resent along with an indication of the error. That is, NLGs can be implemented in a conversational type, and so the NLG may maintain a context the includes prior queries and responses. Providing information as to the nature of the error can help the NLG generate parsable output that complies with the instructions in the prompt 800.

Example 8—Example Overview of Data Generation Techniques for Generating Data for Related Data Artifacts This Example illustrates techniques for establishing relationships between data artifacts, such as tables, within a database, and an overview of two techniques that can be used to generate data that respects relational constraints (or custom constraints) between the data artifacts. One common way to establish relationships is through a primary key—foreign key relationship, where the values in one table's foreign key correspond to the values in another table's primary key. Relationships can also be established through JOIN or GROUPING conditions defined for a view, or through other data artifacts or queries that reference these artifacts.

For instance, a relationship, such as a JOIN or association, may be defined within data artifacts of a virtual data model. These virtual data model objects act as an abstraction layer, allowing relationships to be defined at a higher level. These relationships can then be used to "imply" or establish relationships between underlying artifacts at the database level. This enables data consistency and cohesion, ensuring that data associated with common products, individuals, or other entities is properly related, even if the relationships are not explicitly defined through foreign key constraints.

Figure 11:
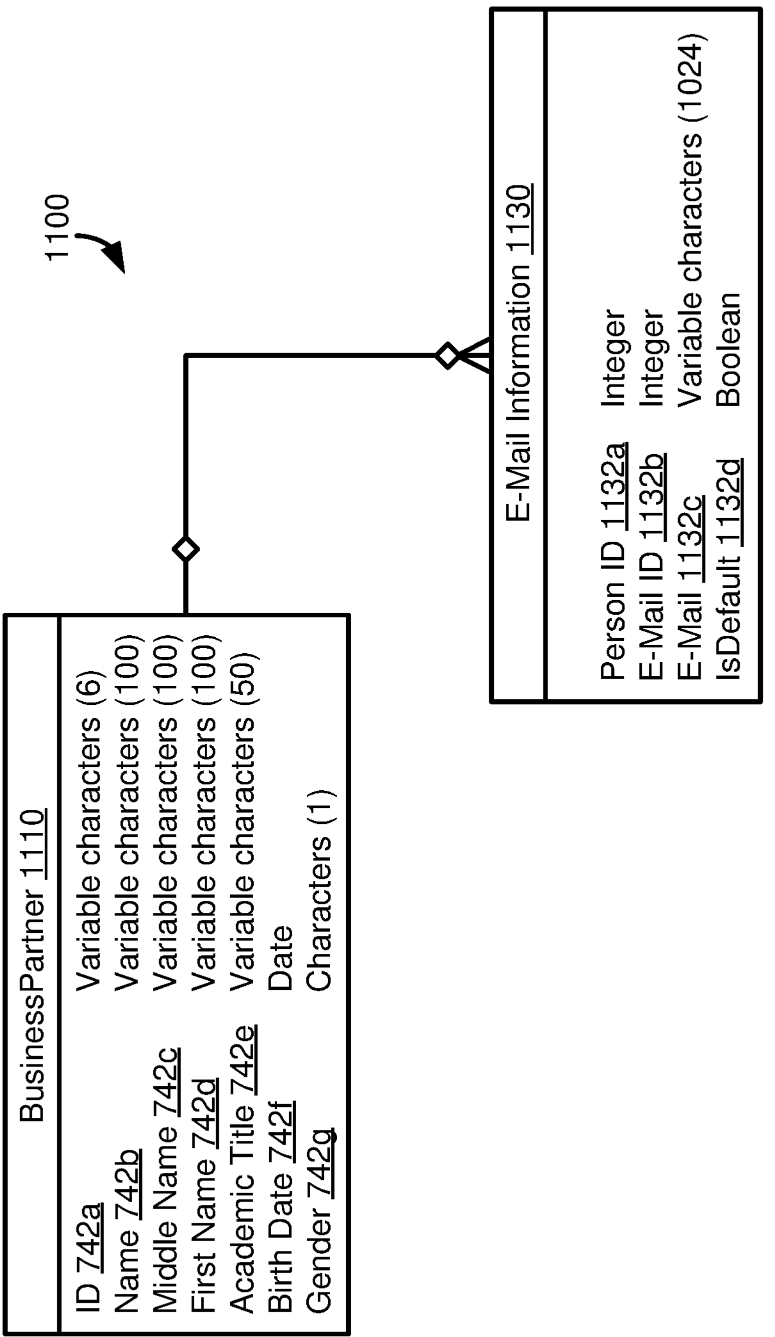
FIG. 11 illustrates two data artifacts and a relation between them, providing a referential constraint.

As described in Example 1, data artifact schemas can be very complex. For purposes of illustration, a simple data artifact schema 1100 with relationships between two data artifacts is shown in FIG. 11. The data artifact schema 1100 includes a data artifact 1110 that corresponds to the table defined according to the table definition 700 of FIG. 7, corresponding to a "business partner." The data artifact 1110 includes attributes 742*a*-742*g* corresponding to the columns defined in the table definition 700. Of particular note, the attribute 742*a*, the identifier, can serve as a primary key for the data artifact 1110.

As shown, the data artifact 1110 has a one-to-many relationship with a data artifact 1130, corresponding to a table that stores email information. The one-to-many relationship provides that a given business partner, having a particular primary key value for the attribute 742*a*, can have multiple email addresses in the data artifact 1130. The data artifact 1130 is shown with attributes 1132*a*-1132*d*, where attribute 1132*a* serves as a foreign key to the data artifact 1110, and where the attribute 1132*b* serves as the primary key for the data artifact 1130.

A method can be provided for obtaining data for related tables, such as having the example method signature:

METHOD get_demo_data_join(Tables tables, Integer i) RETURNS DataSet

This method signature is generally similar to the method signature for obtaining data for a single table, including where i provides a number of records to be generated. Tables can be a tables object, such as including an array of two or more tables for which data is to be generated. In this particular implementation, it is assumed that the tables object also includes JOIN or other relationship information for related tables of the tables object.

The method can be implemented in a number of ways. In one way, data is generated for a table in the tables object in the manner described for single tables. Data for a joined/related table is then generated in a similar manner, but adding to the prompt a constraint that requires the relationship condition to be satisfied. In another implementation, table data is generated for tables in the tables object using the approach described for individual tables. Join conditions are then introduced into such tables. Finally, the data is inserted using INSERT operations, such as has been described. Further details of both implementations are provided.

Example 9—Example Data Generation Technique for Generating Data for Related Data Artifacts Using Prompt Engineering For the first approach described in Example 8, which will be referred to as the "constrained approach," FIG. 12 provides a command structure 1200 that is a modified version of the command structure 500 of FIG. 5. Command structure elements that are the same between the command structures 500 and 1200 maintain the numbering used for the command structure 500.

Compared with the command structure 500, the command structure 1200 adds a history component 1210. The history component 1210 incorporates prior data generation results in future prompts, so that the NLG is aware of previously generated data, and generates additional data that is consistent with the previously generated data given any relationship constraints that may exist between data artifacts.

Figure 13A:
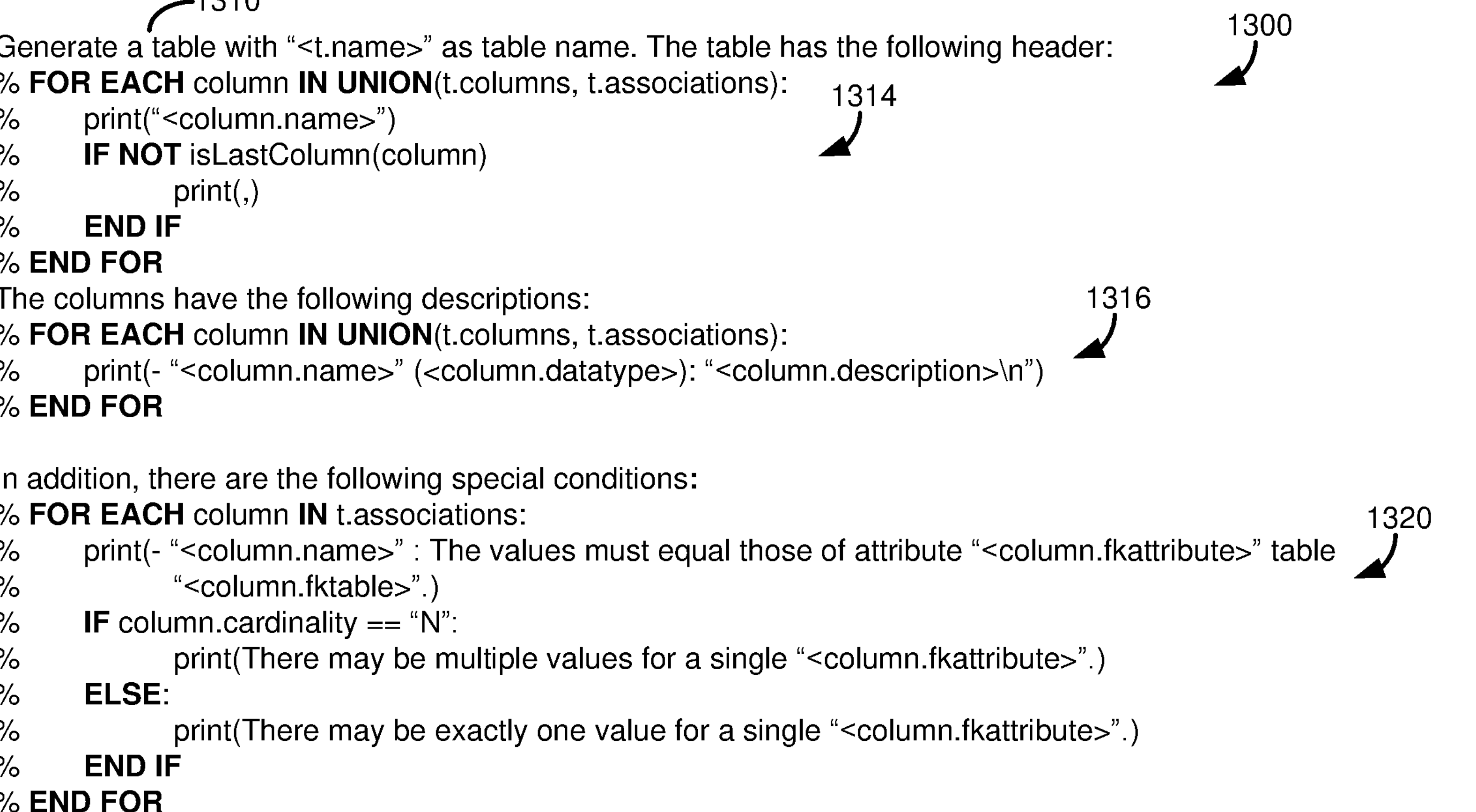
FIGS. 13A and 13B provide example pseudocode for an example technique of generating data for related data artifacts.
Figure 13B:

FIGS. 13A and 13B provide example pseudocode 1300 for generating a prompt to generate data for a table of a set of related tables. That is, for example, a prompt can be generated for each table of a set of tables using the pseudocode 1300, where the pseudocode adds in previously generated data so that newly generated data satisfies relational constraints. Although not shown in the pseudocode 1300, the pseudocode can be part of a loop that runs until all tables specified in a tables object have been processed.

Line 1310 generates an instruction to generate a table having the name of the tables object being processed. Code sections 1314, 1316 print column names and descriptions to the prompt, in a similar manner as for the pseudocode 600 of FIG. 6. However, note that the code sections 1314, 1316 print column and column descriptions from t.columns and t.associations. In some cases, a definition or description of a table can separately specify columns that are "intrinsic" to a table and those are defined with respect to columns of another table. That is, assume there is a table t that has intrinsic columns A, B, and C, and a column D that is defined with respect to a column D' of a table u. Printing columns in t.columns would print columns A, B, and C, and printing columns in table t.associations would print column D. So, printing columns in both t.columns and t.associations prints all columns for the table.

If desired, the pseudocode 600 of FIG. 6 can be modified to also print columns in t.columns and t.associations. This modification can be useful, for example, when it is desired to create data for all columns in a table, without consideration of referential constraints, or when referential constraints/consistency will be handled in another manner.

Code section 1320 provides relational constraint information, which can be a type of custom constraint 520. That is, in some cases, custom constraints can refer to constraints that are added by a user or a computing process, such as for a specific use scenario. However, custom constraints can also be custom in the sense that they are specific to a specific schema/set of data artifacts being processed, and can be automatically added when a data generation method is called. As has been described, relational constraints can be retrieved from a schema definition or otherwise from definitions of data artifacts.

In the code section 1320, the constraints are added for columns of the table being processed that are defined with respect to columns in another table, columns in t.associations. For each such column, a constraint is printed to the prompt being generated that the values for the given column in t.associations must be equal to a value of the corresponding column/attribute of the related table. That is, column.fktable refers to the related table, while column.fkattribute identifies a particular column that is associated with the foreign key relationships. Using the earlier example, column D corresponds to a column.name, D' corresponds to column.fkattribute, and u corresponds to column.fktable.

Cardinality, such as whether the table being processed serves as the "many" table of a one-to-many relationship or whether the tables have a one-to-one relationship, is also handled in the code section 1320. The cardinality of a column in t.associations can be specified in column.cardinality. If column.cardinality has a particular value, such as N, an instruction is written to the prompt that the column can have multiple values for a given value of the related table (e.g., a primary key value, such as a value of D' in table u). Otherwise, an instruction is written to the prompt that the data to be generated can only have a single record for a given value of the related column of the related table. For example, only a single record can be generated for table t for a given value of D' in table u.

Turning to FIG. 13B, any custom constraints (such as user/use case specific constraints) can be added to the prompt being generated in code section 1330, as with code section 640 of the pseudocode 600 of FIG. 6. Similarly, code section 1340 prints sample data, if available, to the prompt as with code section 650. Line 1350 provides the closing command component 525 of the command structure 1200, similar to the line 660 of the pseudocode 600.

FIG. 14 provides example data produced using prompts generated using the approach of the command structure 1200 of FIG. 12, such as using the specific technique outlined in the pseudocode 1300 of FIGS. 13A and 13B. The example data is provided in a table instance 1410 according to the data artifact definition 1110 and a table instance 1420 of the data artifact definition 1130.

It can be seen that the example data in the table instances 1410 and 1420 complies with data type and value constraints specified for the data artifact definitions 1110, 1130 including datatype constraints or value constraints. Further, the data in a given table is semantically "correct," in that it conforms with analog world expectations for the data, such as where male or female genders are associated with first names that are traditionally associated with such genders.

Of particular relevance to this Example, note that the data in the table instance 1420 satisfies constraints imposed by its relationship with the table instance 1410. In particular, values of the column 1132*a* of the table instance 1420 correspond to values present in the related column 742*a* of the table instance 1410. In addition, as allowed by the cardinality constraint for the table instance 1420, the table instance 1420 includes multiple records for a single primary key value for the primary key column 742*a* of the table instance 1410.

Note that the email address values generated by the NLG, in column 1132*c* of the table instance 1420, are also "realistic" with no, or limited, guidance to the NLG. That is, even simply given a column name like "email," the NLG can respond with email addresses in the expected format, such as <string>@<string>.<top-level domain>. Generated addresses can be made even more specific or "relevant" if sample data is provided, such as using a string for a second-level domain specified in the sample data, or using top-level domains specified in the sample data.

As explained, the production of data that satisfies relational constraints, according to this technique, involves advising an NLG of previously generated data as well as relevant constraints, and so the NLG has the information needed to generate additional data that satisfies the constraints. For example, in a prompt to generate the data in the table instance 1420, the prompt to the NLG can include values for the primary key column 742*a* of the table instance 1410, so that the values of the foreign key column 1132*a* of the table instance 1420 are constrained to values that appear in the table instance 1410.

Example 10—Example Generation of Data for Related Data Artifacts Using Post-Generation Data Modification As discussed in Example 8, in another approach, rather than providing constraining values in a prompt to an NLG when generating data, data for data artifacts can be generated and then "connected" afterwards, but prior to insertion of the generated data. This technique can be particularly useful when the history, including the number of constraints/data artifacts involved in a data generation request, as well as the number of requested instances, is large, as it can exceed the maximum number of tokens allowed in a prompt to an NLG.

For tables in a set of tables for which data is to be generated, which includes at least some tables having a constraining relationship, such as a foreign key relationship, data can be generated on a table-by-table basis according to the technique discussed in Example 6. As discussed, the pseudocode 600 of FIG. 6 can be suitably modified so that it generates data for all table columns (such as including intrinsic columns and columns defined with respect to another table).

FIG. 15 provides example data for the data artifacts 1110 and 1130 of FIG. 11 using this technique, shown as tables 1510 and 1530. It can be seen that the foreign key column 1532 of the table 1530 has values that do not appear in the primary key column 1512 of the table 1510. Thus, the initially produced data does not satisfy table constraints. Rules can be applied to the generated data to satisfy relational constraints, such as the rules 1630 of FIG. 16

The rules 1630 are shown as part of pseudocode 1600 for updating generated data to satisfy table constraints. In the pseudocode 1600, the rules 1630 are applied for each association in a set of associations for a set of tables being processed. For each association, the appropriate rule 1630 is selected depending on the cardinality of the relationship between the two tables.

According to a rule 1632, if two tables have a one-to-one relationship, the key values of the column of the first table are copied to the corresponding column of the second table. According to a rule 1634, if the two tables have a one-to-many relationship, a set of values is created based on the values for the column of the first table. The values for the column of the second table are provided by randomly drawing values from that set of values. In other cases, the values can be drawn other than randomly, or can have other constraints. For example, a constraint can be defined that each value of the column in the first table should be associated with two records in the second table, or that a number of records created is between a maximum value and a minimum value. A rule 1636 for a many-to-one relationship is similar in implementation to the rule 1634, except that the set is generated for the second table and from that values are selected for the first table.

A rule 1638 is applied to tables having a many-to-many relationship. A many-to-many relationship can be thought of as a bidirectional foreign key relationship. That is, a primary key of table 1 is a foreign key of table 2, and a primary key of table 2 is a foreign key of table 1. As an example of two tables have a many-many relationship, consider a students table that has attributes of studentID (the primary key), a first name, a last name, and a column, courseID for courses for which the student is enrolled. The courses table includes a courseID column (the primary key), a course name, a course description and a studentID column.

The studentID column in the courses table is a foreign key to the studentID primary key column of the students table. The courseID column in the students table is a foreign key to the courseID primary key column of the courses table. The many-to-many relationship is reflected in that a given student may be enrolled in multiple courses, and a given course has multiple enrolled students.

The rule 1638 specifies that a union is taken of the primary key values of a first table (for example, the students table) and the primary key values of a second table (for example, the courses table). For example, the union set can be a set of tuples having the form (table1.primarykeyvalue, table2.primarykey value). A value from the union set is randomly drawn. Two numbers, n and m, are randomly generated. The value of the first element of the tuple drawn from union set is written to foreign key column of the second table n times, and the value of the second element of the tuple is written to the foreign key column of the first table m times. Note that this result can be achieved in other manners, as long as the result is having at least some of the primary key values of one table be present in multiple rows of the other table.

After generating values using the rules 1630, additional operations can be performed, such as verifying the output/sample data and generating commands to insert the data as instances of appropriate data objects (for example INSERT commands to insert the data as records in a relational database table).

Example 11—Example Data Generated Using Post-Generation Data Modification

FIG. 17 illustrates example data that can be produced using the rules 1630 of FIG. 16, shown in data artifacts 1710 and 1730. The data is generally similar to the data for the data artifacts 1510, 1530 of FIG. 15. In this case, the data artifacts 1710, 1730 have a one-to-many relationships, and so rule 1634 of FIG. 16 is applied. The values in the column 1732 of the data artifact 1730, serving as a foreign key, correspond to values in the primary key column 1712 of the data artifact 1710. In one-to-many relationship is reflected in that multiple rows of the data artifact 1730 have the same primary key value from the primary key column **742*a* of the data artifact 1710**.

Example 12—Example Computing Environment with Data Generation Framework

Figure 18:
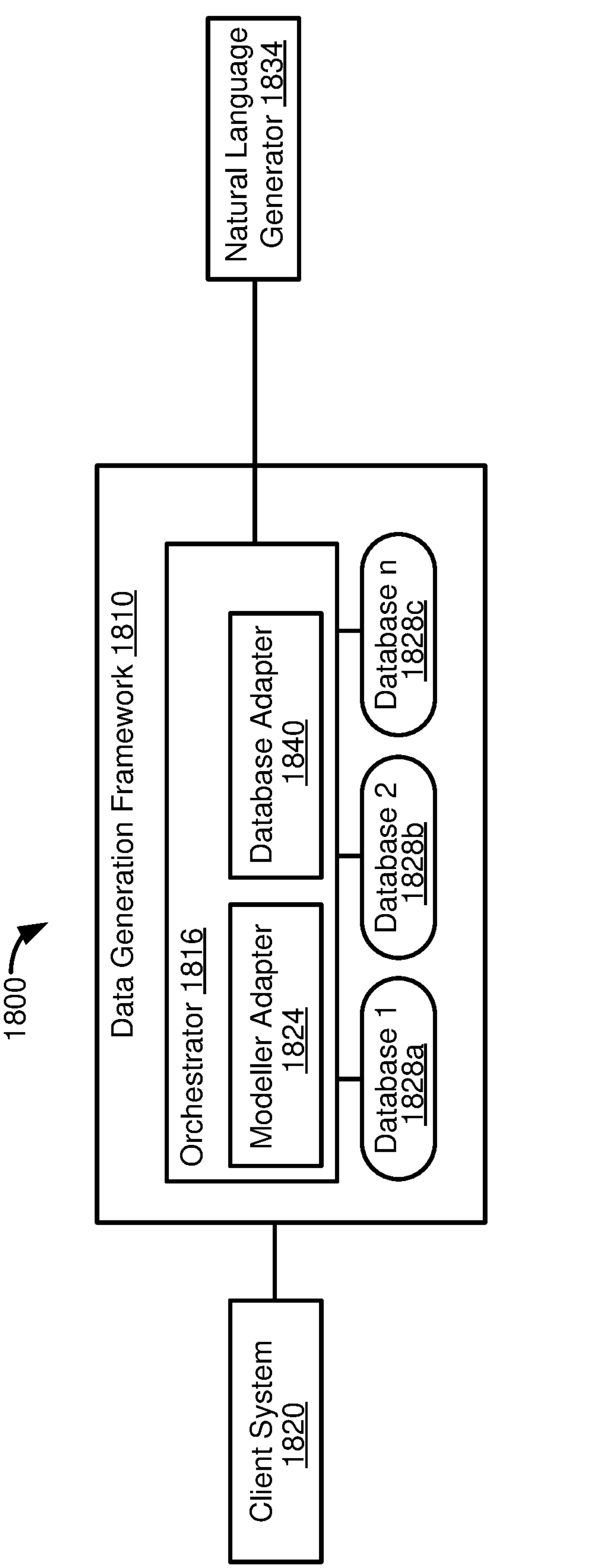
FIG. 18 is a diagram of a computing environment in which disclosed techniques can be implemented, where the computing environment includes a data generation framework that communicates with a natural language generator.
Figure 19:
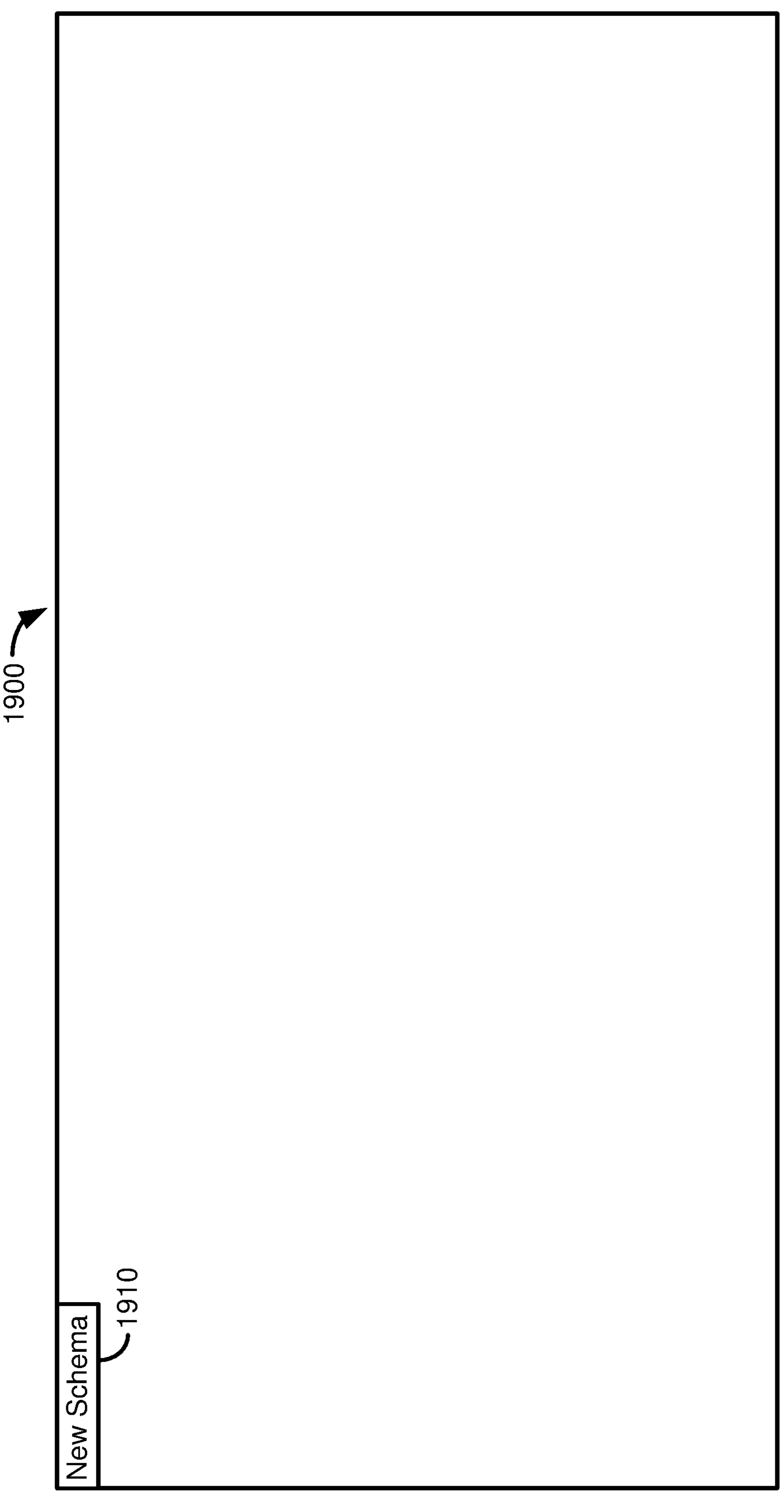
FIGS. 19, 20, 21, and 22 illustrate example user interfaces for defining a data generation task.

FIG. 18 illustrates an example computing environment 1800 in which disclosed techniques can be implemented. The computing environment 1800 includes a data generation framework 1810. The data generation framework 1810 includes an orchestrator 1816. The orchestrator 1816 can be responsible for receiving data generation requests from a client system 1820, causing data to be generated and, optionally sending results or messages related to a data generation request back to the client system.

The orchestrator 1816 can include a modeler adapter 1824 that is in communication with one or more databases 1828 (shown as database **1828*a*-1828*c*). The modeler adapter 1824 performs operations such as reading data model/schema information from the databases 1828. Because databases 1828 can store model/schema information in different ways, the modeler adapter 1824 can be configured to read from multiple types of data model definitional repositories (for example, information schemas, system catalogs, service definitions, or data dictionaries). The definitional information retrieved by the modeler adapter 1824 can include information such as data artifact names, data artifact descriptions, attribute names, attribute descriptions, and information about constraints and relationships between data artifacts. This information can then be used in disclosed techniques, including as described with respect to the pseudocode 600 of FIG. 6, the pseudocode 1300 of FIGS. 13A and 13B, or the pseudocode 1600 of FIG. 16**.

Prompts built using described techniques can be sent from the orchestrator 1816 to a natural language generator 1834. Generated data can be returned from the natural language generator 1834 back to the orchestrator 1816. The orchestrator 1816 can optionally perform additional actions, such as output verification, such as ensuing that the generated data complies value various constraints, including datatype constraints, value constraints, or relational constraints.

The orchestrator 1816 can use a database adapter 1840 to generate suitable commands to cause data generated by the natural language generator 1834 to be written to a database 1828. For example, the database adapter 1840 can be programmed with a template to generate INSERT statements in a particular query language used by a particular database 1828.

In some cases, data can be returned to the client system 1820 by the orchestrator 1816. In other cases, the data is not provided directly to the client system 1820, but is rather written to a database 1828 and a message can be returned to the client system indicating whether the process completed successfully, indicating a number of generated records, or other information as desired.

Example 13—Example Data Generation User Interfaces

Figure 20:
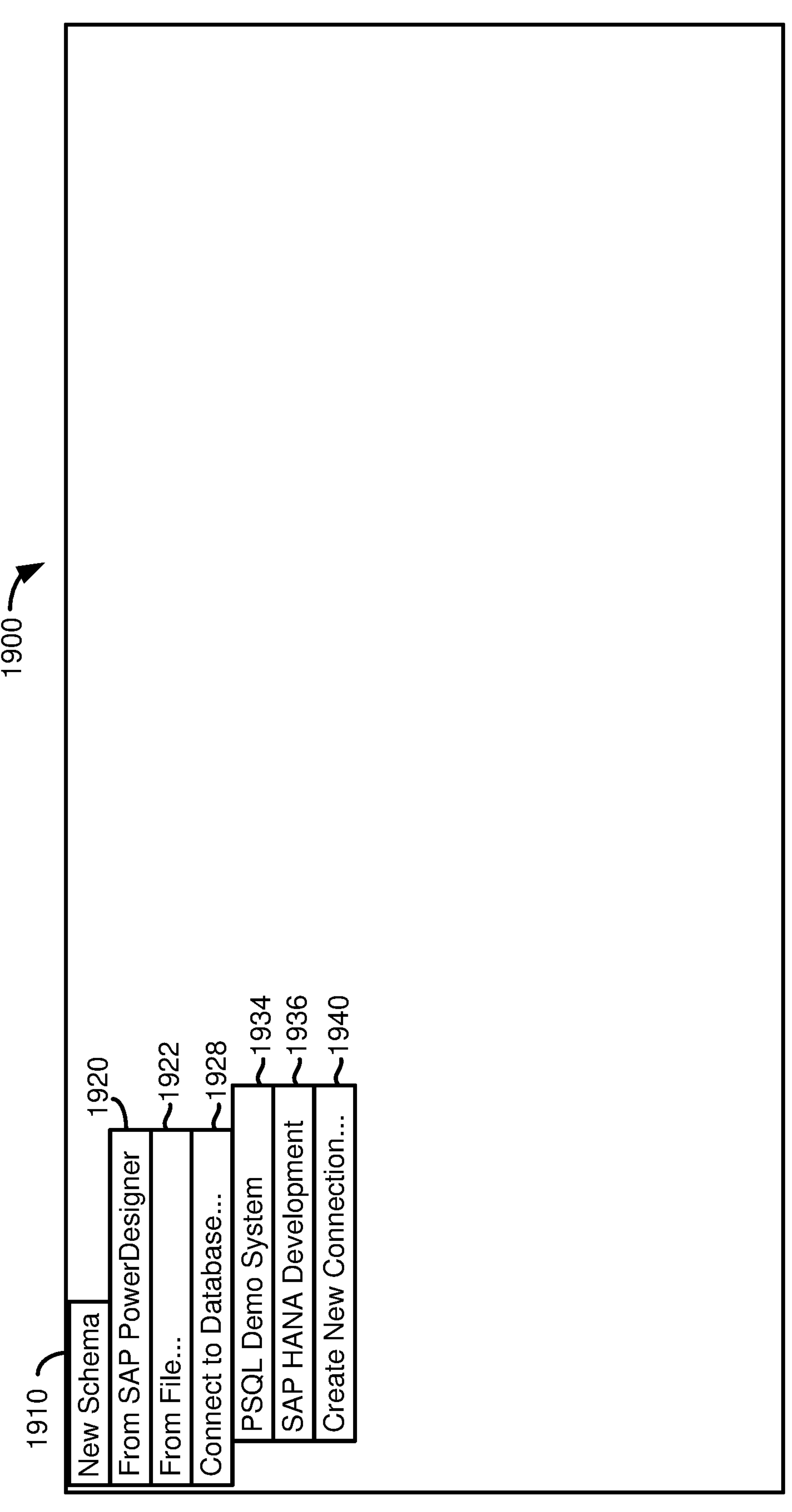

FIGS. 19-22 provide a series of user interfaces that demonstrate a particular implementation of a process by which a user can define and execute a data generation request. A user interface 1900 represents an initial action, where a user can create a data generation request by selecting a "new schema" user interface element 1910. Selecting the user interface element 1910 causes the user interface 1900 to update, as shown in FIG. 20.

In FIG. 20, the user is now presented with options as to how the new schema will be provided. User interface element 1920 allows a user to choose to select a data model definition from a particular data modelling software application. User interface element 1922 allows a user to load a particular data model definition from a file. A user can connect to a database to retrieve a data model definition by first selecting "connect to database" user interface element 1928. Once user interface element 1928 is selected, the user interface 1900 can present particular databases that have been associated with a program implementing the user interface, such as databases associated with user interface elements 1934, 1936.

If a desired database is not shown, a connection to a new database can be established by selecting user interface element 1940. Although not shown, selecting user interface element 1940 can present a user with options to input information such as a database name, a database location, or database login information for establishing a connection. In the event that a database includes multiple data models, the user can also be prompted to identify or select a particular data model to be used.

After a database (or other repository containing data model definitions) has been selected, a user can select particular tables (or other data artifacts) to be included in a data generation request. For example, a visual representation of tables and their relationships can be provided, similar to how data modelling tools can be used to create and edit data model schemas. A user can select particular data artifacts from the display to be included in a data generation request. A user can also manually add tables, such as from a list of tables in a data model definition. In a simpler implementation, a user can supply tables names/identifiers, which are then provided to a data generation method. A user interface can also allow a user to specify a particular table generation technique to be used (such as when data is to be generated for a set of related tables), or to enter any custom constraints to be included in a prompt to a natural language generator.

Figure 21:
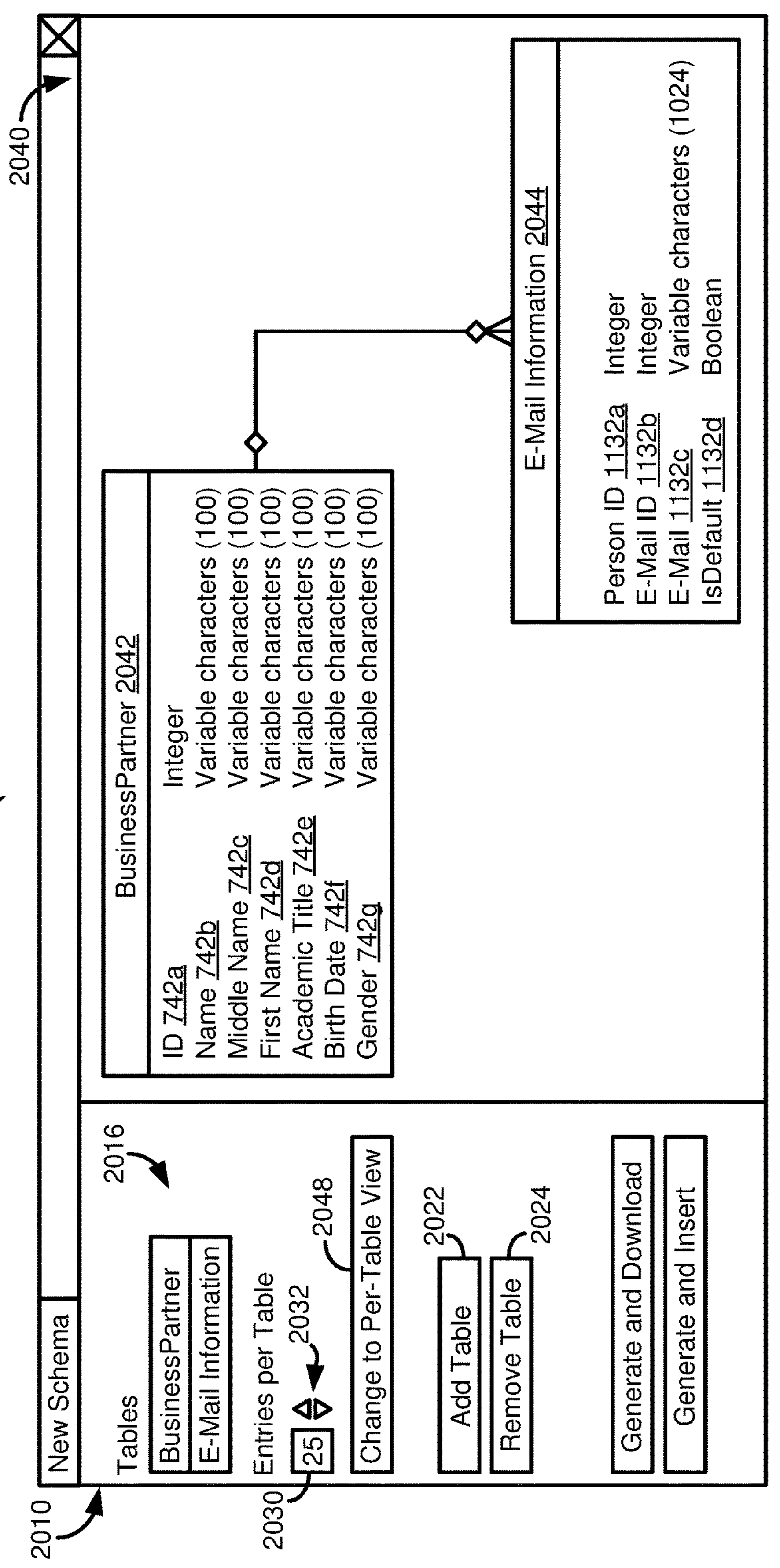

FIG. 21 provides an example user interface 2000 where a user can select tables to be included in a data generation method, as well as to view the selected tables, to enter custom constraints, and to specify parameters of a data generation request, such as a number of data instances (such as table records) to be generated.

In a panel 2010, a user can be presented with a display of parameters of a data generation request, and optionally change values for those parameters. For example, the panel 2010 has a display 2016 of tables currently selected for the data generation request. The panel 2010 is also shown with a user interface element 2022 that can be selected to add another table to a data generation request and a user interface element 2024 that can be selected to remove a table from a data generation request.

The panel 2010 includes a user interface element 2030 that indicates a number of instances (table entries/records) that have been selected for the data generation request, as well as controls 2032 that can be used to modify the value.

A panel 2040 displays information about the tables that have been selected for a data generation request. In this case, the panel displays information about tables 2042, 2044, which are the tables listed in the display 2016, and which correspond to the data artifact definitions 1110, 1130 of FIG. 11. In this case then, the data request is for data for multiple tables, and which is consistent across the tables, such as satisfying relational constraints (for example, foreign key constraints). If it is desired to generate data for single tables (or, for multiple tables, without considering relational constraints), a user can switch to that mode by selecting the "Change to Per-Table View" user interface element 2048. If the user is on a user interface designed for generating data for individual table, that interface can include a user interface element that is similar to the user interface element 2048, the selection of which returns to the "Related Table View" of the user interface 2000.

Figure 22:
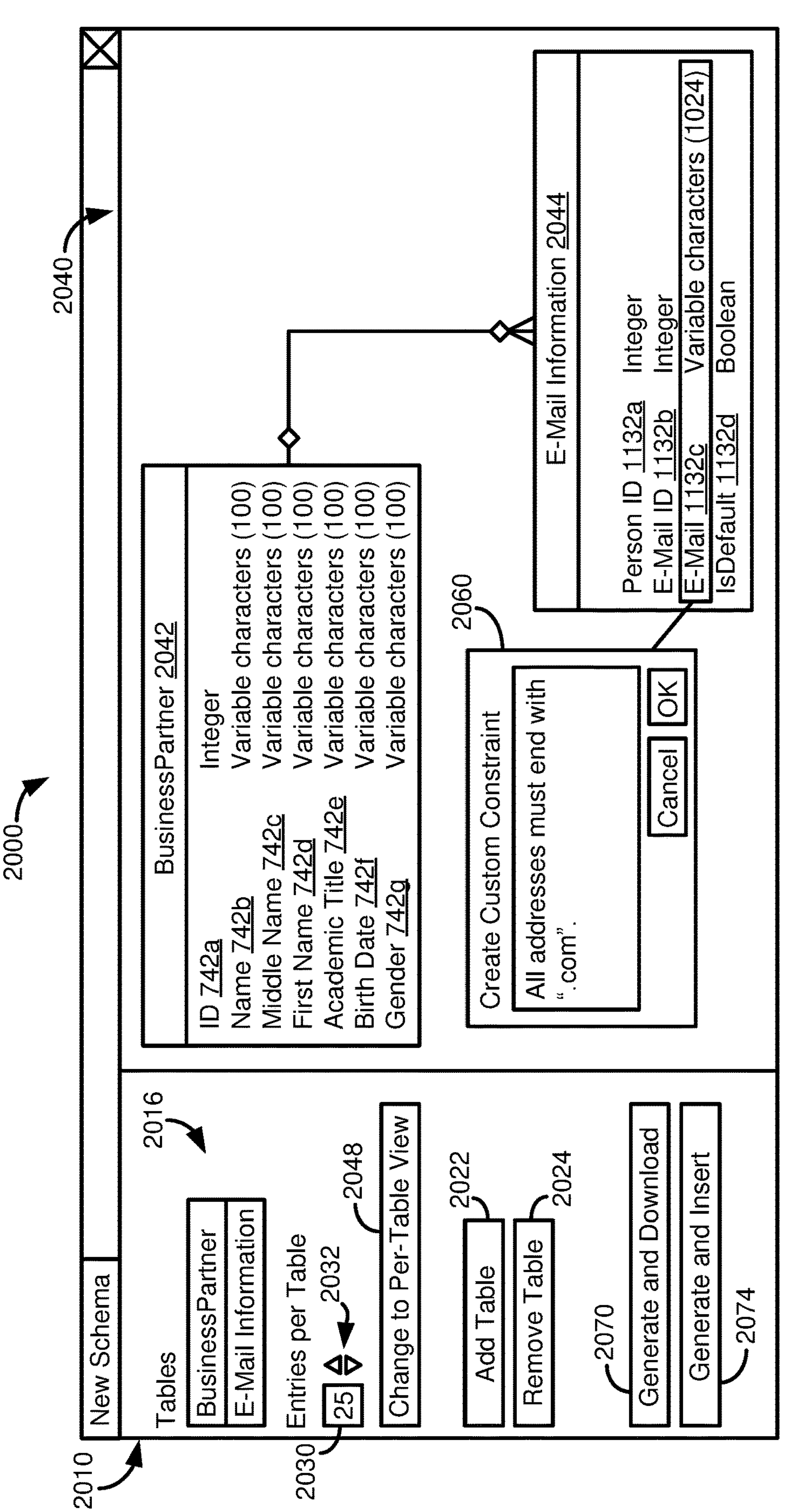

FIG. 22 provides an example of how custom constraints can be specified by a user. A user can select a particular table, or table element (such as a table field/attribute), which causes a constraint entry user interface element 2060 to be displayed. A user can then type in the details of the custom constraint. As the custom constraint will be provided to an NLG, the custom constraint can be entered in a "conversational" style. Thus, the use of an NLG can be beneficial in a number of ways. It can help provide large volumes of semantically correct data, and the creation of data entry tasks can be simplified, so that users can define requests in a low code/no code manner. For example, no code needs to be written by a user in order to select particular tables for a data generation request, or to enter custom constraints.

When a user is satisfied with the definition of a data generation task, the user can cause the task to be executed. In this implementation, the user has two options. By selecting a user interface control 2070, a user can cause data to be generated and downloaded. Once downloaded, various actions can be taken, including reviewing or modifying the data, performing quality checks on the data, filtering the data, combining data with other data, or initiating a process to make the data available for use in a given environment, such as in a database, which can be accessible to, for example, a software application being developed or tested. By selecting a user interface control 2074, a user can select to have data generated and inserted into a database in a single process.

FIG. 23 illustrates a user interface 2100 that presents data generating using a disclosed data generation technique. In this case, the results can be from the selection of the user interface control 2070 of FIG. 22. That is, the data is downloaded, but is not automatically inserted into a database. Rather, the user can choose to edit data associated with the tables 2042, 2044 through respective user interface elements 2120, 2122. Once the data is edited, the user can select to insert the data into a database by selecting user interface element 2126.

Example 14—Example Data Generation Process

Figure 24:
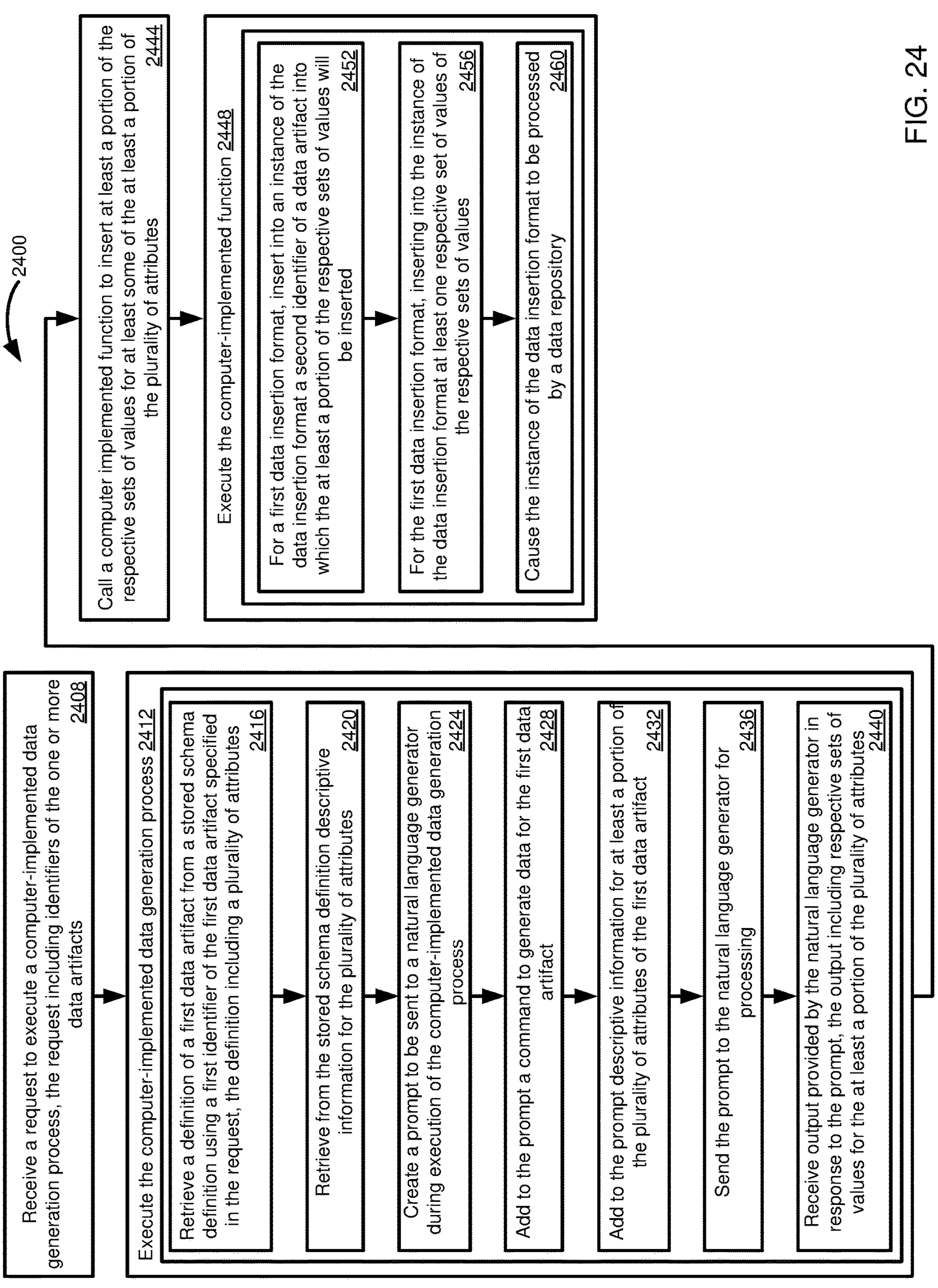
FIG. 24 is a flowchart of generating a prompt whose execution by a natural language generator generates data for a specified data artifact definition, and inserting such data into an instance of the data artifact in a data repository.

FIG. 24 is a flowchart a process 2400 for constructing a data generation prompt for a natural language generator, and inserting data values generated thereby into a data repository. At 2408, a request is received to execute a computer-implemented data generation process. The computer-implemented data generation process generates data for one or more data artifacts specified in the request to execute the computer-implemented data generation process. The request includes identifiers of the one or more data artifacts.

The computer-implemented data generation process is executed at 2412. The computer-implemented data generation process includes, at 2416, retrieving a definition of a first data artifact from a stored schema definition using a first identifier of the first data artifact. The first identifier is specified in the request. The definition of the first data artifact includes a plurality of attributes.

At 2420, definition descriptive information for the plurality of attributes is retrieved from the stored schema. A prompt is created at 2424 to be sent to a natural language generator during execution of the computer-implemented data generation process. A command to generate data for the first data artifact is added to the prompt at 2428. At 2432, descriptive information for at least a portion of the plurality of attributes of the first data artifact is added to the prompt.

The prompt is sent to the natural language generator for processing at 2436. At 2440, output provided by the natural language generator in response to the prompt is received. The output includes respective sets of values for the at least a portion of the plurality of attributes.

A computer implemented function to insert at least a portion of the respective sets of values for at least some of the at least a portion of the plurality of attributes is called at 2444. The computer-implemented function is executed at 2448. Executing the computer-implemented function includes, at 2452, for a first data insertion format, inserting into an instance of the data insertion format a second identifier of a data artifact into which the at least a portion of the respective sets of values will be inserted. At 2456, for the first data insertion format, at least one respective set of values of the respective sets of values is inserted into the instance of the data insertion format. The instance of the data insertion format is caused to be processed by a data repository at 2460.

Example 15—Computing Systems

Figure 25:
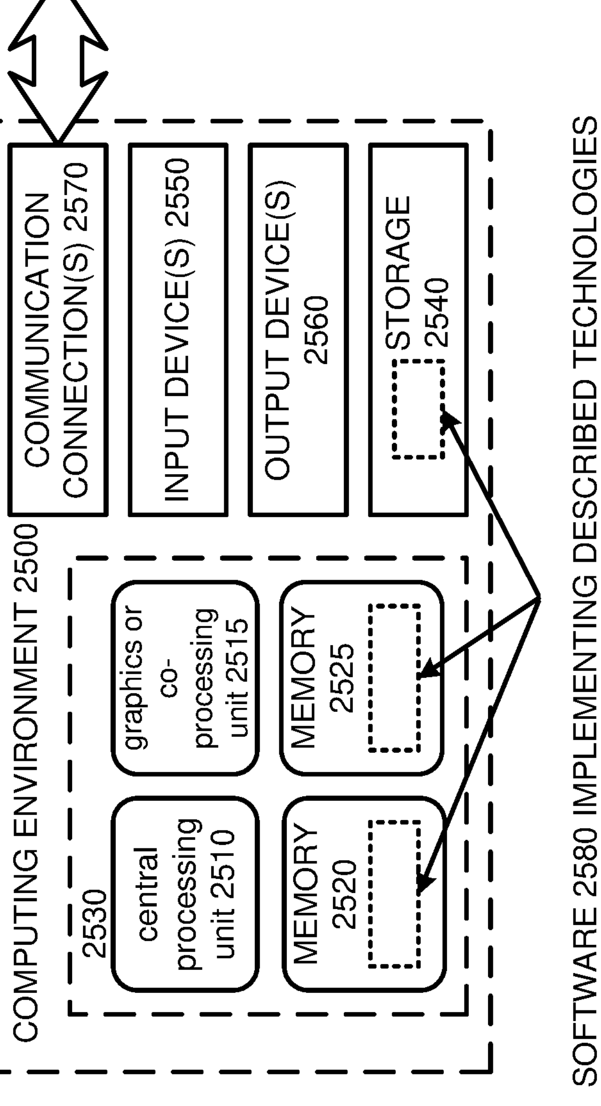
FIG. 25 is a diagram of an example computing system in which some described embodiments can be implemented.

FIG. 25 depicts a generalized example of a suitable computing system 2500 in which the described innovations may be implemented. The computing system 2500 is not intended to suggest any limitation as to scope of use or functionality of the present disclosure, as the innovations may be implemented in diverse general-purpose or special-purpose computing systems.

With reference to FIG. 25, the computing system 2500 includes one or more processing units 2510, 2515 and memory 2520, 2525. In FIG. 25, this basic configuration 2530 is included within a dashed line. The processing units 2510, 2515 execute computer-executable instructions, such as for implementing a database environment, and associated methods, described in Examples 1-14. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 24 shows a central processing unit 2510 as well as a graphics processing unit or co-processing unit 2515. The tangible memory 2520, 2525 may be volatile memory (e.g., registers, cache, RAM), non-volatile memory (e.g., ROM, EEPROM, flash memory, etc.), or some combination of the two, accessible by the processing unit(s) 2510, 2515. The memory 2520, 2525 stores software 2580 implementing one or more innovations described herein, in the form of computer-executable instructions suitable for execution by the processing unit(s) 2510, 2515.

A computing system 2500 may have additional features. For example, the computing system 2500 includes storage 2540, one or more input devices 2550, one or more output devices 2560, and one or more communication connections 2570. An interconnection mechanism (not shown) such as a bus, controller, or network interconnects the components of the computing system 2500. Typically, operating system software (not shown) provides an operating environment for other software executing in the computing system 2500, and coordinates activities of the components of the computing system 2500.

The tangible storage 2540 may be removable or non-removable, and includes magnetic disks, magnetic tapes or cassettes, CD-ROMs, DVDs, or any other medium which can be used to store information in a non-transitory way, and which can be accessed within the computing system 2500. The storage 2540 stores instructions for the software 2580 implementing one or more innovations described herein.

The input device(s) 2550 may be a touch input device such as a keyboard, mouse, pen, or trackball, a voice input device, a scanning device, or another device that provides input to the computing system 2500. The output device(s) 2560 may be a display, printer, speaker, CD-writer, or another device that provides output from the computing system 2500.

The communication connection(s) 2570 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 16—Cloud Computing Environment

Figure 26:
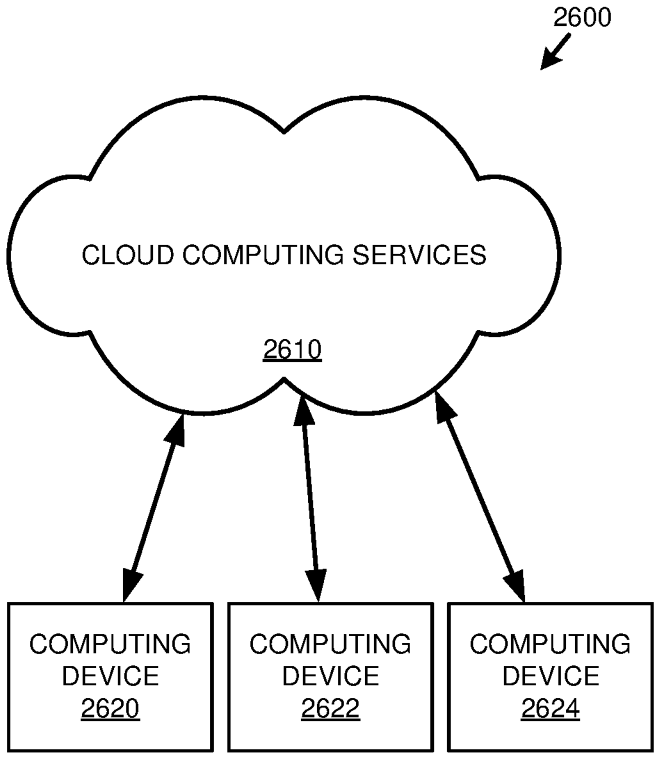
FIG. 26 is an example cloud computing environment that can be used in conjunction with the technologies described herein.

FIG. 26 depicts an example cloud computing environment 2600 in which the described technologies can be implemented. The cloud computing environment 2600 comprises cloud computing services 2610. The cloud computing services 2610 can comprise various types of cloud computing resources, such as computer servers, data storage repositories, networking resources, etc. The cloud computing services 2610 can be centrally located (e.g., provided by a data center of a business or organization) or distributed (e.g., provided by various computing resources located at different locations, such as different data centers and/or located in different cities or countries).

The cloud computing services 2610 are utilized by various types of computing devices (e.g., client computing devices), such as computing devices 2620, 2622, and 2624. For example, the computing devices (e.g., 2620, 2622, and 2624) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 17—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 24, computer-readable storage media include memory 2520 and 2525, and storage 2540. The term computer-readable storage media does not include signals and carrier waves. In addition, the term computer-readable storage media does not include communication connections (e.g., 2570).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

one or more hardware processor units coupled to the at least one memory; and one or more computer readable storage media storing computer-executable instructions that, when executed, cause the computing system to perform operations comprising:

receiving a request to execute a computer-implemented data generation process, wherein the computer-implemented data generation process generates data for one or more data artifacts specified in the request to execute the computer-implemented data generation process, the request comprising identifiers of the one or more data artifacts;

executing the computer-implemented data generation process, the computer-implemented data generation process comprising:

retrieving a definition of a first data artifact from a stored schema definition using a first identifier of the first data artifact, the first identifier being specified in the request, the definition of the first data artifact comprising a plurality of attributes;

retrieving from the stored schema definition descriptive information for the plurality of attributes;

creating a prompt to be sent to a natural language generator during execution of the computer-implemented data generation process, wherein the prompt is generated from a prompt template and the prompt template specifies a data generation instruction for the natural language generator;

adding to the prompt a command to generate data for the first data artifact;

adding to the prompt descriptive information for at least a portion of the plurality of attributes of the first data artifact, wherein the first identifier of the first data artifact and the descriptive information for the at least a portion of the plurality of attributes are added to the prompt template through execution of the computer-implemented data generation process;

sending the prompt to the natural language generator for processing;

receiving output provided by the natural language generator in response to the prompt, the output comprising respective sets of values for the at least a portion of the plurality of attributes; and calling a computer implemented function to insert at least a portion of the respective sets of values for some of the at least a portion of the plurality of attributes;

executing the computer-implemented function, the executing the computer-implemented function comprising:

for a first data insertion format, inserting into an instance of the first data insertion format a second identifier of a data artifact into which the at least a portion of the respective sets of values will be inserted;

for the first data insertion format, inserting into the instance of the first data insertion format at least one respective set of values of the respective sets of values; and causing the instance of the first data insertion format to be processed by a data repository.

2. The computing system of claim 1, wherein the request to execute the computer-implemented data generation process specifies a plurality of data artifacts and the prompt is a first prompt, the operations further comprising:

from the schema definition, determining a first referential constraint between the first data artifact and a second data artifact of the plurality of data artifacts; and adding to a second prompt an instruction that values of at least a first attribute of the first data artifact and at least a first attribute of the second data artifact are to be consistent, wherein the second prompt is the first prompt or is a prompt other than the first prompt.

3. The computing system of claim 2, wherein the first referential constraint comprises a foreign-key relationship.

4. The computing system of claim 2, wherein the second prompt is different than the first prompt, the second prompt requests generation of values for a set of attributes for the second data artifact, and the second prompt comprises at least a portion of data values generated by the natural language generator in response to processing of the first prompt by the natural language generator.

5. The computing system of claim 1, wherein the request to execute the computer-implemented data generation process specifies a plurality of data artifacts, the request is a first request, and the prompt is a first prompt, the operations further comprising:

executing the computer-implemented data generation process in response to a second request to execute the computer-implemented data generation process, the executing comprising (1) generating a second prompt, the second prompt being different than the first prompt and comprising descriptive information for attributes of a second data artifact, the attributes of the second data artifact differing at least in part from attributes of the first data artifact, the descriptive information for the attributes of the second data artifact being retrieved from the schema definition using an identifier of the second data artifact specified in the second request; (2) sending the second prompt to the natural language generator for processing; and (3) receiving output provided by the natural language generator in response to the second prompt, the output comprising respective sets of values for the at least a portion of the plurality of attributes of the second data artifact; and in a computer-implemented process, replacing at least a portion of values in a first attribute of the second data artifact associated with a referential constraint between the first data artifact and the second data artifact with values of a first attribute of the first data artifact associated with the referential constraint.

6. The computing system of claim 5, wherein the replacing is performed based on a cardinality of a relationship between the first data artifact and the second data artifact.

7. The computing system of claim 6, wherein the cardinality is a one-to-one relationship, and the replacing comprises copying values from the first attribute of the first data artifact to the first attribute of the second data artifact.

8. The computing system of claim 6, wherein the cardinality is a one-to-many relationship and the replacing comprises:

creating a set of key values using values from a key column of the first data artifact;

selecting values from the set of key values; and replacing values of a key column of the second data artifact with the values selected from the set of key values.

9. The computing system of claim 6, wherein the cardinality is a many-to-many relationship, and the replacing comprises:

creating a set of key values from a primary key column of the first data artifact and from a primary key column of the second data artifact;

selecting values from the set of key values; and writing the selected values to a foreign key column of the first data artifact a first number of times and writing the selected values to a foreign key column of the second data artifact a second number of times.

10. The computing system of claim 1, wherein the descriptive information for the at least a portion of the plurality of attributes of the first data artifact comprises a datatype and the output of the natural language generator provides values in the datatype.

11. The computing system of claim 1, wherein the descriptive information for the at least a portion of the plurality of attributes of the first data artifact comprises at least one value specification.

12. The computing system of claim 1, the operations further comprising:

receiving user input providing a constraint for at least one attribute of the plurality of attributes; and adding the constraint to the prompt.

13. The computing system of claim 1, wherein the prompt comprises a command specifying that the output of the natural language generator is to be limited to the respective sets of values.

14. The computing system of claim 1, the operations further comprising:

rendering a user interface; and through the user interface, receiving a selection of the first data artifact.

15. The computing system of claim 14, the operations further comprising:

through the user interface receiving a custom constraint to be applied during an execution of the computer-implemented data generation process; and adding the custom constraint to the prompt.

16. A method, implemented in a computing system comprising at least one hardware processor and at least one memory coupled to the at least one hardware processor, the method comprising:

receiving a request to execute a computer-implemented data generation process, wherein the computer-implemented data generation process generates data for one or more data artifacts specified in the request to execute the computer-implemented data generation process, the request comprising identifiers of the one or more data artifacts;

executing the computer-implemented data generation process, the computer-implemented data generation process comprising:

retrieving a definition of a first data artifact from a stored schema definition using a first identifier of the first data artifact, the first identifier being specified in the request, the definition of the first data artifact comprising a plurality of attributes;

retrieving from the stored schema definition descriptive information for the plurality of attributes;

creating a prompt to be sent to a natural language generator during execution of the computer-implemented data generation process, wherein the prompt is generated from a prompt template and the prompt template specifies a data generation instruction for the natural language generator;

adding to the prompt a command to generate data for the first data artifact;

adding descriptive information for at least a portion of the plurality of attributes of the first data artifact to the prompt, wherein the first identifier of the first data artifact and the descriptive information for the at least a portion of the plurality of attributes are added to the prompt template through execution of the computer-implemented data generation process;

sending the prompt to the natural language generator for processing;

receiving output provided by the natural language generator in response to the prompt, the output comprising respective sets of values for the at least a portion of the plurality of attributes; and calling a computer implemented function to insert at least a portion of the respective sets of values for some of the at least a portion of the plurality of attributes;

executing the computer-implemented function, the executing the computer-implemented function comprising:

for a first data insertion format, inserting into an instance of the first data insertion format a second identifier of a data artifact into which the at least a portion of the respective sets of values will be inserted;

for the first data insertion format, inserting into the instance of the first data insertion format at least one respective set of values of the respective sets of values; and causing the instance of the first data insertion format to be processed by a data repository.

17. The method of claim 16, wherein the request to execute the computer-implemented data generation process specifies a plurality of data artifacts and the prompt is a first prompt, the method further comprising:

from the schema definition, determining a first referential constraint between the first data artifact and a second data artifact of the plurality of data artifacts; and adding to a second prompt an instruction that values of at least a first attribute of the first data artifact and at least a first attribute of the second data artifact are to be consistent, wherein the second prompt is the first prompt or is a prompt other than the first prompt.

18. One or more non-transitory computer-readable storage media comprising:

computer-executable instructions that, when executed by a computing system comprising at least one hardware processor and at least one memory coupled to the at least on hardware processor, cause the computing system to receive a request to execute a computer-implemented data generation process, wherein the computer-implemented data generation process generates data for one or more data artifacts specified in the request to execute the computer-implemented data generation process, the request comprising identifiers of the one or more data artifacts;

computer-executable instructions that, when executed by the computing system, cause the computing system to execute the computer-implemented data generation process, the computer-implemented data generation process comprising:

computer-executable instructions that, when executed by the computing system, cause the computing system to retrieve a definition of a first data artifact from a stored schema definition using a first identifier of the first data artifact, the first identifier being specified in the request, the definition of the first data artifact comprising a plurality of attributes;

computer-executable instructions that, when executed by the computing system, cause the computing system to retrieve from the stored schema definition descriptive information for the plurality of attributes;

computer-executable instructions that, when executed by the computing system, cause the computing system to create a prompt to be sent to a natural language generator during execution of the computer-implemented data generation process, wherein the prompt is generated from a prompt template and the prompt template specifies a data generation instruction for the natural language generator;

computer-executable instructions that, when executed by the computing system, cause the computing system to add to the prompt a command to generate data for the first data artifact;

computer-executable instructions that, when executed by the computing system, cause the computing system to add descriptive information for at least a portion of the plurality of attributes of the first data artifact to the prompt, wherein the first identifier of the first data artifact and the descriptive information for the at least a portion of the plurality of attributes are added to the prompt template through execution of the computer-implemented data generation process;

computer-executable instructions that, when executed by the computing system, cause the computing system to send the prompt to the natural language generator for processing;

computer-executable instructions that, when executed by the computing system, cause the computing system to receive output provided by the natural language generator in response to the prompt, the output comprising respective sets of values for the at least a portion of the plurality of attributes; and computer-executable instructions that, when executed by the computing system, cause the computing system to call a computer implemented function to insert at least a portion of the respective sets of values for at some of the at least a portion of the plurality of attributes;

computer-executable instructions that, when executed by the computing system, cause the computing system to execute the computer-implemented function, the executing the computer-implemented function comprising:

computer-executable instructions that, when executed by the computing system, cause the computing system to, for a first data insertion format, insert into an instance of the first data insertion format a second identifier of a data artifact into which the at least a portion of the respective sets of values will be inserted;

computer-executable instructions that, when executed by the computing system, cause the computing system to, for the first data insertion format, insert into the instance of the first data insertion format at least one respective set of values of the respective sets of values; and computer-executable instructions that, when executed by the computing system, cause the computing system to cause the instance of the first data insertion format to be processed by a data repository.

19. The one or more non-transitory computer-readable storage media of claim 18, wherein the request to execute the computer-implemented data generation process specifies a plurality of data artifacts and the prompt is a first prompt, further comprising:

computer-executable instructions that, when executed by the computing system, cause the computing system to, from the schema definition, determine a first referential constraint between the first data artifact and a second data artifact of the plurality of data artifacts; and computer-executable instructions that, when executed by the computing system, cause the computing system to add to a second prompt an instruction that values of at least a first attribute of the first data artifact and at least a first attribute of the second data artifact are to be consistent, wherein the second prompt is the first prompt or is a prompt other than the first prompt.

20. The one or more non-transitory computer-readable storage media of claim 18, wherein the request to execute the computer-implemented data generation process specifies a plurality of data artifacts, the request is a first request, and the prompt is a first prompt, further comprising:

computer-executable instructions that, when executed by the computing system, cause the computing system to execute the computer-implemented data generation process in response to a second request to execute the computer-implemented data generation process, the executing comprising (1) generating a second prompt, the second prompt being different than the first prompt and comprising descriptive information for attributes of a second data artifact, the attributes of the second data artifact differing at least in part from attributes of the first data artifact, the descriptive information for the attributes of the second data artifact being retrieved from the schema definition using an identifier of the second data artifact specified in the second request; (2) sending the second prompt to the natural language generator for processing; and (3) receiving output provided by the natural language generator in response to the second prompt, the output comprising respective sets of values for the at least a portion of the plurality of attributes of the second data artifact; and computer-executable instructions that, when executed by the computing system, cause the computing system to, in a computer-implemented process, replace at least a portion of values in a first attribute of the second data artifact associated with a referential constraint between the first data artifact and the second data artifact with values of a first attribute of the first data artifact associated with the referential constraint.

* * * * *